US008572695B2

(12) United States Patent
Bailloeul et al.

(10) Patent No.: US 8,572,695 B2
(45) Date of Patent: Oct. 29, 2013

(54) METHOD FOR APPLYING A PHYSICAL SEAL AUTHORIZATION TO DOCUMENTS IN ELECTRONIC WORKFLOWS

(75) Inventors: Timothee Bailloeul, Sunnyvale, CA (US); Kenneth F. Gudan, Sunnyvale, CA (US); Xu Liu, Cupertino, CA (US); Kurt W. Piersol, Campbell, CA (US); Michael J. Gormish, Redwood City, CA (US); John W. Barrus, Menlo Park, CA (US); Edward L. Schwartz, Sunnyvale, CA (US); Richard D. Kosoglow, Redwood City, CA (US); Stephen R. Savitzky, San Jose, CA (US); Sergey Chemishkian, Cupertino, CA (US)

(73) Assignee: Ricoh Co., Ltd, Tokyo (JP)

( * ) Notice: Subject to any disclaimer, the term of this patent is extended or adjusted under 35 U.S.C. 154(b) by 414 days.

(21) Appl. No.: 12/555,689

(22) Filed: Sep. 8, 2009

(65) Prior Publication Data

US 2011/0061092 A1    Mar. 10, 2011

(51) Int. Cl.
*G06F 21/24* (2006.01)
(52) U.S. Cl.
USPC ............................................. 726/4; 726/21
(58) Field of Classification Search
USPC ........................................ 713/186; 726/1–21
See application file for complete search history.

(56) References Cited

U.S. PATENT DOCUMENTS

| | | | |
|---|---|---|---|
| 5,920,685 A | | 7/1999 | Romano et al. |
| 5,992,753 A | * | 11/1999 | Xu ........................... 235/472.01 |
| 6,061,478 A | | 5/2000 | Kanoh et al. |
| 6,341,349 B1 | | 1/2002 | Takaragi et al. |
| 6,401,206 B1 | | 6/2002 | Khan et al. |
| 6,650,370 B1 | * | 11/2003 | Bradley et al. ................ 348/344 |
| 7,502,934 B2 | | 3/2009 | Dietl |

(Continued)

FOREIGN PATENT DOCUMENTS

CN    200710020370    8/2007

OTHER PUBLICATIONS

"A Tutorial on Fingerprint Recognition" (2005) by Davide Maltoni; pp. 43-68 from Lecture Notes in Computer Science, 2005, vol. 3161/2005 (26 pages); originally downloaded from http://www.springerlink.com/content/rja6gyb3ybvldngt/fulltext.pdf.*

(Continued)

*Primary Examiner* — Carl Colin
*Assistant Examiner* — Don Zhao
(74) *Attorney, Agent, or Firm* — Patent Law Works LLP

(57) ABSTRACT

A system and method for applying a pre-existing physical seal authorization to documents provides for authentication of electronic documents using physical seals and without interrupting the electronic workflow. The system of the present invention includes a seal capture device coupled to a computer, and the computer coupled by a network to a paper-like document server. The seal capture device detects depression of a seal thereon and outputs the image of the seal and other metadata to the computer. The computer stores the metadata in its local log using a logging module. The computer also adds the image of the seal and other metadata to the electronic document being displayed. Finally, the computer sends the metadata for storage in the global log of the paper-like document server, and the authorized document to the next step in the electronic workflow. The paper-like document server stores the metadata in other servers or entangles the global log with the logs of other servers for additional security.

20 Claims, 14 Drawing Sheets

(56) References Cited

U.S. PATENT DOCUMENTS

| | | | | |
|---|---|---|---|---|
| 2002/0042884 | A1* | 4/2002 | Wu et al. | 713/201 |
| 2003/0138135 | A1* | 7/2003 | Chung et al. | 382/119 |
| 2003/0141959 | A1* | 7/2003 | Keogh et al. | 340/5.53 |
| 2004/0003295 | A1 | 1/2004 | Elderfield et al. | |
| 2005/0226422 | A1* | 10/2005 | Meyer et al. | 380/277 |
| 2005/0226473 | A1* | 10/2005 | Ramesh | 382/119 |
| 2006/0177059 | A1* | 8/2006 | Tanaka | 380/243 |
| 2006/0212708 | A9* | 9/2006 | Wong et al. | 713/176 |
| 2008/0226132 | A1* | 9/2008 | Gardner | 382/107 |
| 2008/0243751 | A1* | 10/2008 | Gormish et al. | 707/1 |
| 2009/0002327 | A1* | 1/2009 | Wilson et al. | 345/173 |
| 2010/0100743 | A1* | 4/2010 | Ali et al. | 713/176 |

OTHER PUBLICATIONS

"Git User's Manual (for version 1.5.3 or newer)" (snapshot Sep. 6, 2008) by Git; 71 pages; converted to PDF originally from http://www.kernel.org/pub/software/scm/git/docs/user-manual.html via http://www.archive.org/.*

"Version Control with Subversion—for Subversion 1.5" (2008) by Ben Collins-Sussman et al.; 407 pages; originally downloaded from http://svnbook.red-bean.com/en/1.5/svn-book.pdf.*

"Schneier on Security" (Aug. 17, 2006; snapshot Dec. 5, 2008) by Bruce Schneir; 4 pages; converted to PDF originally from http://www.schneier.com/blog/archives/2006/08/hanko_security.html via http://www.archive.org/.*

"SignatureGem LCD4x3" (2005) by Topaz Systems; 1 page; originally downloaded from http://www.topazsystems.com/products/specs/TL755.pdf.*

"She Devil" (snapshot Jan. 6, 2005) by beautifulmonroe; 2 pages; converted to PDF from http://www.themoviespoiler.com/Spoilers/shedevil.html via http://www.archive.org/.*

"Crypto Hanko" (Aug. 15, 2006) by wiml; 1 page; converted to PDF originally from http://www.halfbakery.com/idea/Crypto_20Hanko.*

"Family Seal Rings" (2008) by Society Gifts; 1 page; converted to PDF originally from http://www.societygifts.com/Rings/Family-Seal-Rings.html via http://www.archive.org/.*

"The Hanko system" (Aug. 14, 2006; snapshot Jul. 26, 2008) by tellurian; 3 pages; converted to PDF from http://www.metafilter.com/53897/The-Hanko-system via http://www.archive.org/.*

"Authentidate—USPS EPM How It Works," AuthentiDate, 2009,1 page, [Online] [Retrieved on Apr. 21, 2010]; Retrieved from the Internet<URL:http://www.authentidate.com/index.php/content/view/28/86/>.

"Electronic Signature Law of the Peoples Republic of China," www.7139.com, Jul. 23, 2007, 5 pages [Online] [Retrieved on Apr. 21, 2010] Retrieved from the Internet<URL:http://www.7139.com/enfl/fl/200707/17131.html>.

"Ink Markup Language (InkML)," W3C Working Draft, W3C, Oct. 23, 2006, 61 pages, [Online] [Retrieved on Apr. 21, 2010] Retrieved from the Internet<URL:http://www.w3.org/TR/InkML>.

"Software—DocuWorks 6.0," Astra Graphia Tbk, 2006, 2 pages, [Online] [Retrieved on Apr. 21, 2010]; Retrieved from the Internet<URL:http://www.documentsolution.com/ID/prod_software_docuworks_6.php>.

"StampKing eWorkflow Electronic Approval System," Active e-Solution Limited, 2007, 1 page, [Online] [Retrieved on Apr. 21, 2010] Retrieved from the Internet<URL:http://www.active.com.hk/Products/Products_pages.aspx?p=StampKing+eWorkflow+-+Electronic+Approval+and+Stamp+System>.

"Weaving Web Dreams: World PC Expo 2003—Makuhari, Japan," 24 pages, [Online] [Retrieved on Apr. 21, 2010] Retrieved from the Internet<URL:http://isobe.typepad.com/pda_dreams/2003/09/world_pc_expo_2_1.html >.

U.S. Appl. No. 12/244,707, filed Oct. 2, 2008, Berkner et al.
U.S. Appl. No. 12/244,721, filed Oct. 2, 2008, Piersol.
U.S. Appl. No. 12/244,714, filed Oct. 2, 2008, Barrus et al.

* cited by examiner

SUBMITTED

Invention Disclosure Evaluation Form

Evaluator: _____  Date: 11/6/2008

Ref #: ☐

A patent should be pursued.  Strongly disagree ○———○———○———○———●———○———○ Strongly agree
                                                            Neutral Revolutionary - significantly different than prior art  Strongly disagree ○———○———○———○———●———○———○ Strongly agree
                                                                                Neutral Logical addition or continuation of other ideas within ☐  Strongly disagree ○———○———○———○———●———○———○ Strongly agree
                                                                                    Neutral Relevant to ☐ Business activities  Strongly disagree ○———○———○———○———●———○———○ Strongly agree
                                                                Neutral Good technical transfer possibilities  Strongly disagree ○———○———○———●———○———○———○ Strongly agree
                                                                    Neutral Good defensive value  Strongly disagree ○———●———○———○———○———○———○ Strongly agree
                                                    Neutral Infringement Easily detected  Strongly disagree ○———○———○———●———○———○———○ Strongly agree
                                                            Neutral (SUBMIT)  (PREV)

Comments for inventor: _____
_____
_____
_____
_____

(FIRST)  (NEXT)

Is there a need for an urgent filing?  Yes / (No)
Feedback Requested?  Yes / (No)

Legend: ├──┼──┼──┼──┼──┤

Figure 9A

SUBMITTED

Invention Disclosure Evaluation Form

Evaluator: _____  Date: 11/6/2008

Ref #: ☐

| | |
|---|---|
| A patent should be pursued. | Strongly disagree O—O—O—O—●—O—O Strongly agree (Neutral) |
| Revolutionary - significantly different than prior art | Strongly disagree O—O—O—O—●—O—O Strongly agree (Neutral) |
| Logical addition or continuation of other ideas within ☐ | Strongly disagree O—O—O—O—●—O—O Strongly agree (Neutral) |
| Relevant to ☐ Business activities | Strongly disagree O—O—O—O—●—O—O Strongly agree (Neutral) |
| Good technical transfer possibilities | Strongly disagree O—O—O—●—O—O—O Strongly agree (Neutral) |
| Good defensive value | Strongly disagree O—●—O—O—O—O—O Strongly agree (Neutral) |
| Infringement Easily detected | Strongly disagree O—O—O—●—O—O—O Strongly agree (Neutral) |

S U B M I T — PREV

Comments for inventor: _____

FIRST — NEXT

Is there a need for an urgent filing?  Yes / (No)
Feedback Requested?  Yes / (No)

Legend 

Figure 9C

METHOD FOR APPLYING A PHYSICAL SEAL AUTHORIZATION TO DOCUMENTS IN ELECTRONIC WORKFLOWS

BACKGROUND OF THE INVENTION

The present invention relates to distributed computing systems. More particularly, the present invention relates to systems and methods for distributing processing of electronic workflows. Still more particularly, the present invention relates to a method and sensing device for applying a physical seal authorization to electronic workflows.

Much of data processing has historically been performed using paper forms and manual completion and manipulation of such forms. Paper forms are easy to use and require no training. The location of the paper form itself reflects the state of workflow progression that has been completed. Paper also provides a medium upon which unique identifiers such as signatures, comments or sketches may be added. Forms are used ubiquitously throughout most office environments and are a critical part of conventional paper-based processing. However, such paper-based processing is not without its disadvantages. In particular, the distribution of forms especially across large distances and distributed offices is expensive, slow and requires copying. Furthermore, the availability of the paper form is limited, is environmentally unfriendly and the cost for storage of completed forms processed by the workflow can be expensive.

There have been attempts to overcome these disadvantages with computing devices in their various different forms. The landscape of computing devices typically available for many users has changed from a small homogeneous set of computing devices such as desktop computers coupled to a network to a large heterogeneous set of computing devices with significantly varying functionality and computational power. For example, there are any number of computing devices such as but not limited to personal computers, personal digital assistants, smart phones, laptop computers, notebook computers, e-book readers and digital cameras that are coupled for use with networks, servers and peripheral devices. While many of these devices have an ability to communicate over a network whether it be wired or wireless, their ability to interface with service providers or other peripheral devices to implement workflows is significantly limited because each peripheral device requires compliance with different data communication protocols, has its own application interface and data has to be in a format specific to that peripheral and often different from the format of other peripherals.

Other businesses use 'tablet PCs' which are essentially personal computers designed to accept input primarily from a stylus. These devices present the capabilities of a PC, with menus and file folders and arbitrary applications and try to make those capabilities easy to access with a stylus. Sometimes the user interface is customized for a particular purpose, for example, for medical charts. In this case, the user does not need to learn to use a PC operating system, but must still learn the special purpose software. Such devices are typically only useful with the back-end system they were designed to be used with. There are also email systems but they generally do not provide a way to simply annotate documents, and introduce their own problems such as user level password management for secure systems.

Yet another attempt by the prior art to overcome the shortcomings of paper-based form processing has been to provide centralized workflow systems. However, such centralized workflow systems often require that each user log in. These systems also require a significant amount of customized programming. Thus, even the smallest change to a workflow cannot be performed immediately, requires a custom modification by a skilled programmer, and typically introduces significant delay before the centralized system matches the desired workflow. Furthermore, such centralized system workflows do not accommodate arbitrary comments or modification of electronic documents. Typically such systems only provide access when a user is fully connected to the system, and users often take documents out of the central system, use a word processor to edit them and then return them to the system. Such centralized workflow systems make it difficult to create ad hoc workflows or groups especially with "outsiders" i.e. people who are not part of a company or group and especially people who should not be given the same access to all documents as a group member.

One particular problem with prior art electronic workflows is that it is difficult to use a physical seal to authenticate electronic documents. In particular, this is a significant problem for Asian societies where the use of a seal or "hanko" is widespread. In western societies handwritten signatures are commonly used to approve documents or transactions, while in East Asia, seals are used in lieu of signatures in personal documents, office paperwork, contracts, or any item requiring acknowledgment or authorship. China, Japan, and Korea currently use a mixture of seal imprints and handwritten signatures. Seals can serve as identification with signatures because they are more difficult to forge (when compared to forging a signature) and only the owner has access to her own seal.

In Japan, a hanko, also called an inkan, is a seal used by individuals and corporations to stamp a name in ink onto a paper document. It is used as an equivalent to a signature or signing initials. Important documents, including bank loans, sale or purchase of real estate, etc. require a registered seal, called a Jitsuin, to be used as a signature. Unregistered seals are used at banks, post offices, or wherever a signature is required in any daily life transactions. Banks always provide stamp pads or ink paste, in addition to dry cleansing tissues to help their customers authorize documents. Home thieves often target the owner's bankbook and hanko, which may not be missed for some time after the theft. It then becomes very difficult to prove that it was not the original hanko's owner who stamped the document. For this reason, it is very important to store a registered hanko (Jitsuin) or any hanko used for any "official" purpose, such as open a bank account, in a place where others cannot get it.

In China, seals are always used for official purposes in administrative or corporate contexts. In 2004, the Chinese government stipulated that any governmental document is authorized and authenticated only if it is stamped. The Chinese law says the stamp and handwritten signature are legally of equal effect. But in practice, the official stamp is always needed. The same situation occurs in commercial affairs: 100% of the companies need official stamps. A company has many different stamps for different usages. At the very beginning, the company should register the stamps in a Chinese administration department (typically the Chinese state administration of Industry and Commerce). In either China or Japan, when collecting parcels or registered post, the name seal serves as an identifier, akin to a signature.

In the US, seal imprints are also used by national organizations to certify important administrative documents like passports, visas, or US Mail cancellation stamps, notary services, etc.

While a user can always print an electronic document on paper, add their seal by stamping the piece of paper and then scan the printed document including the added seal, this is very disruptive to electronic workflows as well as wasteful of paper and other resources. There have been attempts in the prior art to address this problem by creating electronic seals or "hankos" that must be used with specially adapted digitizing pads. However, these specially designed "electronic" hanko devices are not the same as the pre-existing physical seals which people are accustomed to seeing. It's also unclear what document is being approved. Another type of "electronic seal approval" in the prior art is maintaining a library of approval images. In this case, to authorize a document, a user keys in a login name and password for access to a library of seals, selects the image, and it is imprinted electronically on the document. In this case, the library is exposed to illegal activity, and authorization becomes a login/password, not a physical approval motion to which society is accustomed. Thus there has not been widespread adoption of these electronic seals. Furthermore, such existing electronic seals do not have any security measures to protect against illicit usage.

SUMMARY OF THE INVENTION

The present invention overcomes the deficiencies of the prior art with a system and method for applying a physical seal authorization to documents in electronic workflows. The system is particularly advantageous because it provides for authentication of electronic documents using pre-existing physical seals and without interrupting the electronic workflow. In one embodiment, the system of the present invention includes: a seal capture device coupled to a computer, and the computer coupled by a network to a paper-like document server. The paper-like document server is in turn coupled to any number of additional servers. The seal capture device detects depression of a seal thereon and outputs the image of the seal footprint and other metadata to the computer. The computer stores the image of the seal and the other metadata in its local log using a logging module. The computer also adds the image of the seal and other metadata to the electronic document being displayed. Finally, the computer sends the metadata for storage in the global log of the paper-like document server, while sending the electronic document with the seal image attached further into the workflow. In another embodiment, the paper-like document server stores the metadata in other servers or entangles the global log with the logs of other servers for additional security.

The present invention also includes a number of novel methods including a method for applying a physical seal authorization to documents in electronic workflows, and a method for verifying a seal that has been added to an electronic document.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIGS. 9A-9C are graphic representations of example images displayed by the computer in accordance with the present invention.

DETAILED DESCRIPTION OF PREFERRED EMBODIMENTS

Figure 1:
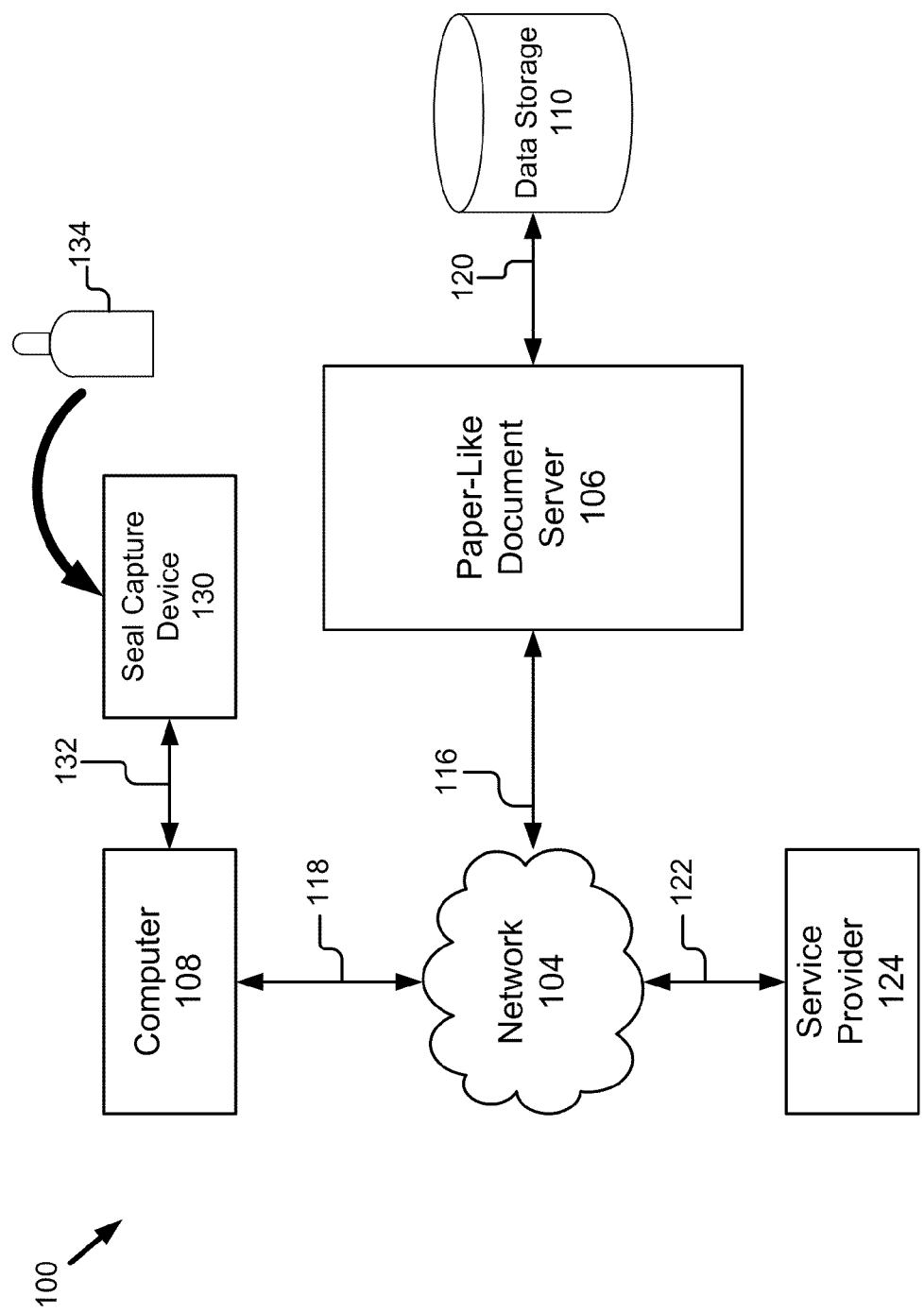
FIG. 1 is a block diagram of an embodiment of a system for paper-like forms processing including a computer and a seal capture device in accordance with the present invention.

A system and method for applying and verifying a physical seal authorization to documents in electronic workflows is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices that are exemplified in a hardware and software platform such as the Amazon Kindle. However, the present invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1 shows an embodiment of a system 100 for paper-like forms processing. Referring now to FIG. 1, this embodiment of system 100 comprises: a network 104, a computer 108, a paper-like document server 106, data storage 110, one or more service providers 124, a seal capture device 130 and a representative physical seal 134.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or include portions of a telecommunications network for sending data in a variety of different communication protocols.

The computer 108 is a conventional type such as personal computer. The computer 108 is coupled to the network 104 by signal line 118. In one embodiment, the computer 108 accesses and communicates with the paper-like document server 106 to initially input a form for processing or verify processing of a particular form according to a workflow. For example, a user may use the computer 108 to input to the paper-like document server 106 a document such as a PDF file for further processing. Similarly, the computer 108 may be the recipient of a completed form after all processing according to its workflow has been completed. Finally, the computer 108 may communicate with a verification module of the paper-like document server 106 to verify the status or completion of processing of a particular form. The computer 108 also includes a driver or other software for interacting with the seal capture device 130. This driver is operable on the computer 108 to add an electronic representation or image captured by the seal capture device 130. The driver also interacts with any logging module or local log created and stored on the computer 108. For example, the computer 108 stores metadata and images received from the seal capture device 130 in its local log. This includes creating and storing hashes based on existing entries in the local log as well as data received from the seal capture device 130.

The paper-like document server 106 is coupled to the network 104 via signal line 116 for communication with the computer 108 and the service provider 124. The paper-like document server 106 is also coupled by signal line 120 to the data storage 110. The paper-like document server 106 includes a central scheduler 208, a logging module 210, a service provider manager and rater 214, a modification module 216, a retry module 218 and a verification module 230 (See FIG. 2). The paper-like document server 106 sends and receives documents from the computer 108 and the service provider 124, maintains a log for verification, and implements a paper-like workflow and processing the documents. This is particularly advantageous because the paper-like document server 106 implements paper-like processing of transactions and handles the overhead of processing electronic documents so that it is invisible to the user.

The data storage 110 is coupled to the paper-like document server 106 via signal line 120. The data storage 110 is a non-volatile memory device or similar permanent storage device and media. Data storage device 110 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs. In one embodiment, the data storage 110 also comprises a database for storing data, results, transaction histories and other information for the paper-like document server 106.

At least one service provider 124 is coupled to the network 104 by respective signal lines 122. The service provider 124 is a computing device of a conventional type such as a server or personal computer and associated software. In some embodiments, the service providers 124 are computer systems that allow human interaction to provide the service offered. One example of service provider is a human user with a personal computer, a smart phone or a computing pad. The service provider 124 is capable of delivering one or more services. While only a single service provider 124 is shown in FIG. 1, those skilled in the art will realize that there may be two or more service providers 124 each providing a different service.

Some of the services that are provided by different service providers 124 include but are not limited to: 1) Recognition services that receive images or strokes and return metadata such as optical mark recognition, machine optical character recognition, optical character recognition with human proofreading, handwriting recognition, barcode recognition/decoding, face recognition and image cleanup or enhancement; 2) Upload services that receive images or strokes and create entries in databases such as archiving, storing document images on a server, storing metadata on a CRM or accounts payable, or accounts receivable database and redundant storage of transactions to another service; 3) Information retrieval services (Public & Private) such as looking up words in a dictionary, looking up stock prices, or looking up addresses in a customer list; 4) Data processing services such as proofreading, language translation, format translation, encryption, decryption, spell checking and correction, grammar checking and correction, test grading, image clean up, survey data aggregation, data mining, remote procedure calling using any of several RPC mechanisms, and registration of legal compliance with time stamping; 5) Advertising services such as those that that match ads to documents; 6) Banking services such as credit card number verification, credit worthiness checking, form completeness verification, retrieval of transaction summaries and monetary transfers, notification messaging; 7) Fraud detection services such as transaction redundancy checking, cheat detection using this similarity of inputs, cheat detection using timing of inputs, and transaction pattern recognition to spot suspicious transactions; and 8) Electronic approval services such as signature verification, manager approval, company authorizations, digital signing, etc.

The seal capture device 130 is a device for detecting application of, pressing or stamping of the physical seal 134 thereon and generating an image of the footprint of the physical seal 134 as well as other metadata. The seal capture device 130 is coupled by a signal line 132 for interaction with and data transfer to the computer 108. For example, the signal line 132 is a coupling via a universal serial bus (USB) to receive power and transfer data. The seal capture device 130 generates and sends event signals as well as images of the physical seal 134 and other metadata to the computer 108. One particular advantage of the present invention is that the seal capture device 130 as well as the other processes of the present invention ensure that the authentication of the stamped document has a higher level of security. The security comes from the digitally tying of the physical seal 134 to the electronic document that is in part performed by the seal capture device 130. Embodiments of and the operation of the seal capture device 130 are described below in more detail with reference to FIGS. 5A-9C.

The representative physical seal 134 is shown in FIG. 1 to represent the seal of any user. It is assumed that each user will have their own physical seal 134 and that depending on the particular user of the computer 108 different physical seals 134 may be stamped upon the seal capture device 130 to authenticate various documents displayed by the computer 108. The representative physical seal 134 is used as a matter of convenience throughout this application to represent the physical seal of any user. However, it should be noted that the representative seals 134 are one in the same with seals presently in use and used with paper, thus the present invention will have a higher adoption rate by users because it does not require a specific new electronic seal and can work with existing traditional seals.

Paper-like Document Server 106

Figure 2:
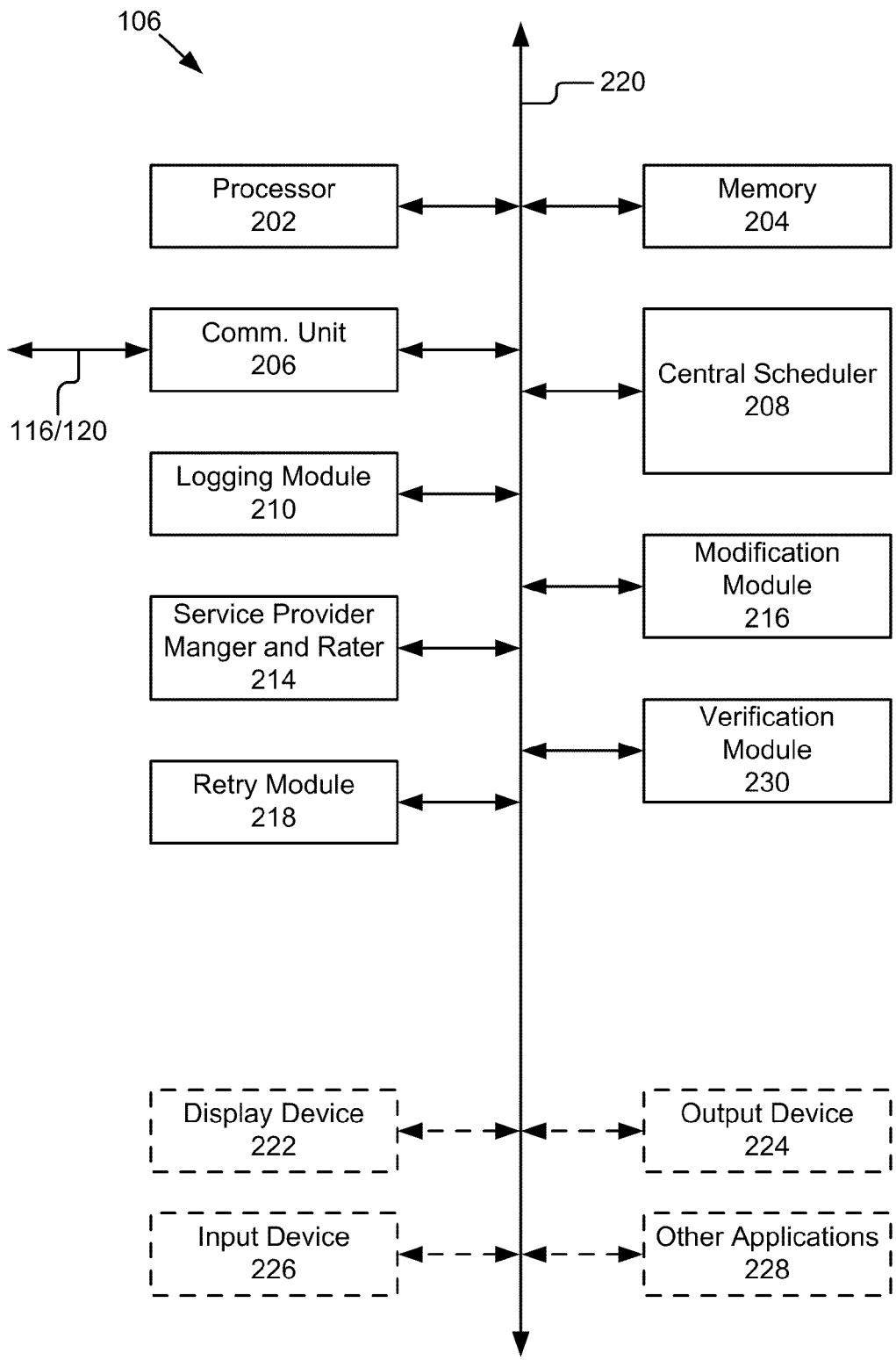
FIG. 2 is a block diagram of an embodiment of a paper-like document server in accordance with the present invention.

Referring now to FIG. 2, an embodiment of a paper-like document server 106 is described in more detail. The paper-like document server 106 comprises a processor 202, a memory 204, a communication unit 206, a central scheduler 208, a logging module 210, a service provider manager and rater 214, a modification module 216, a retry module 218 a bus 220 and a verification module 230. In an alternate embodiment, the paper-like document server 106 further comprises a display device 222, an output device 224, an input device 226 and other applications 228.

The processor 202 comprises an arithmetic logic unit, a microprocessor, a general purpose controller or some other processor array to perform computations, provide electronic display signals to display device 222, and perform the paper-like form processing of the present invention. The processor 202 is coupled to the bus 220 for communication with the other components of the paper-like document server 106. Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays and physical configurations are possible. The processor 202 also includes an operating system executable by the processor 202 such as but not limited to WINDOWS®, MacOS X, or UNIX® based operating systems.

The memory 204 stores instructions and/or data that may be executed by processor 202. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory such as a hard disk drive or flash drive for storing log information on a more permanent basis. The memory 204 is coupled by the bus 220 for communication with the other components of the paper-like document server 106.

The communication unit 206 is coupled to signal lines 116, 120 and the bus 220. The communication unit 206 links the processor 202 to the network 104 and other processing systems. The communication unit 206 also provides other conventional connections to the network 104 for distribution of files using standard network protocols such as TCP/IP, HTTP, HTTPS and SMTP as will be understood to those skilled in the art. In an alternate embodiment, the communication unit 206 is coupled to the network 104 or data storage 110 by a wireless connection and the communication unit 206 includes a transceiver for sending and receiving compound documents. In such an alternate embodiment, the communication unit 206 includes a Wi-Fi transceiver for wireless communication with an access point. In another alternate embodiment, the communication unit 206 includes a Bluetooth® transceiver for wireless communication with other devices. In yet another embodiment, the communication unit 206 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 206 includes ports for wired connectivity such as but not limited to USB, SD, or CAT-5, etc.

The central scheduler 208 is software and routines for processing and routing compound documents. The central scheduler 208 creates compound documents 400 and creates formatted messages. The central scheduler 208 also works with the logging module 210 to create a global transaction log(stored in the logging module 210, the memory 204 or the data storage 110) and publishes or makes available that log as needed. The central scheduler 208 determines transaction steps, selects services providers and routes formatted messages on to the next location (or the next transaction step) as part of a paper-like processing workflow. The central scheduler 208 includes a document transfer module such as an email server for sending compound documents. The central scheduler 208 is also coupled to and interacts with the service provider manager and rater 214, the modification module 216 and the retry module 218 to send and receive data from these modules and provide information for their respective functions. The central scheduler 208 is responsible for recording all transactions made against the compound document 400, and for choosing which service provider 124 will perform any needed transactions.

The logging module 210 is software and routines for creating and storing global logs of for the transactions processed by the paper-like document server 106. In one embodiment this global log is stored by the logging module 210 in the memory 204, and more particularly, in a nonvolatile storage portion of the memory 204. In other embodiments, the global log is copied or written directly to data storage 110. In one embodiment, the logging module 210 is routines executable by the processor 202 to provide the functionality described below and in co-pending application Ser. No. 12/555,663, filed on Sep. 8, 2009, entitled "Paper-Like Forms Processing System & Method" which is incorporated reference in its entirety. The logging module 210 is particularly critical to provide verification of processing and completion of transactions. In one embodiment, the logging module 210 also includes routines for publishing or storing in a publicly available location on the network 104 the logs for transactions. The logging module 210 is coupled by the bus 220 to the processor 202, the memory 204, and the communication unit 206. In one embodiment, the logging module 210 includes storage or memory and stores the logs of the actions and processed transactions of the paper-like document server 106.

The service provider manager and rater 214 is software and routines executable by the processor 202 for managing the service providers 124, monitoring their completion of transactions and rating them to generate a quality of service values or ensure that they meet quality of service levels. The service provider manager and rater 214 are coupled to the central scheduler 208, the processor 202, the memory 204 and the communication unit 206. The service provider manager and rater 214 cooperate with the central scheduler 208 to select service providers 124 for particular transactions. In certain instances, multiple service providers 124 will be associated with a transaction as a primary, secondary, etc. service provider and serve as backups to each other. The service provider manager and rater 214 also monitor transactions for completion. In the event a transaction fails to complete, the service provider manager and rater 214 evaluates the reasons that the transaction was not completed and gives the service providers 124 associated with the transaction a rating or quality of service measure. The operation of the service provider manager and rater 214 are described in more detail below.

The modification module 216 is software and routines executable by the processor 202 for extracting or modifying content from a compound document 400. In some instances, it is advantageous to control or limit the amount of information that is provided to a particular service provider 124. For example, for highly sensitive or confidential material, is advantageous to provide only the information necessary for a particular service provider to perform the transaction. The modification module 216 is coupled to the processor 202, the memory 204 and the central scheduler 208 to receive a compound document and filtering instructions, and return a modified or redacted version of the compound document 400. The operation of the modification module 216 is described in more detail below.

The retry module 218 is software and routines executable by the processor 202 for monitoring for failures of transactions and restarting them. The retry module 218 monitors for messages from the service providers 124 or the central scheduler 208 that a transaction has failed. In one case, the service provider 124 sends a message indicating that it cannot complete the transaction. In a second case, the central scheduler 208 monitors the time at which the transaction was sent and accepted by the service provider 124. If after a predetermined amount of time the service provider 124 has not returned the results of the transaction, the central scheduler 208 sends a timeout failure message to the retry module 218. In a third case, the service provider 124 completes the transaction but the results are poor in quality and/or unacceptable. The retry module 218 is responsible for monitoring the transaction processing, monitoring for failure signals and in response, performing the actions to restart the transaction including identifying another service provider 124, communicating with that service provider 124 and sending that service provider 124 the transaction as a compound document 400, and notify the logging module 210 to update its logs. In some cases, a user determines at a much later time that an operation is incomplete or has failed, and signals the retry module 218 that the form must be retried. The operation of the retry module 218 is written in more detail below.

The bus 220 represents a shared bus for communicating information and data throughout the paper-like document server 106. The bus 220 may represent one or more buses including an industry standard architecture (ISA) bus, a peripheral component interconnect (PCI) bus, a universal serial bus (USB), or some other bus known in the art to provide similar functionality. Components coupled to processor 202 by system bus 220 include the memory 204, the communication unit 206, the central scheduler 208, the logging module 210, the service provider manager and rater 214, the modification module 216, the retry module 218, the verification module 230, the display device 222, the output device 224, the input device 226 and other applications 228.

The verification module 230 is software and routines executable by the processor 202 for verifying the processing of transactions of the compound document 400. In one embodiment, the verification module 230 is routines executable by the processor 202 to perform verification as described below in the logging section. The verification module 230 is coupled by bus 220 to the processor 202, the memory 204 and the communication unit 206.

The display device 222 represents any device equipped to display electronic images and data as described herein. Display device 222 may be, for example, a cathode ray tube (CRT), liquid crystal display (LCD), or any other similarly equipped display device, screen, or monitor. In one embodiment, display device 222 is equipped with a touch screen in which a touch sensitive, transparent panel is aligned with the screen of display device 222.

The output device 224 is a conventional type such as LEDs. This output device 224 indicates status of the server 106 such as: 1) whether it has power and is operational; 2) whether it has network connectivity; 3) whether it is processing transactions. Those skilled in the art will recognize that there may be a variety of additional status indicators beyond those listed above that may be part of the output device 224. The output device 224 also includes speakers in other embodiments.

The input device 226 is a keyboard and cursor control. The keyboard represents an alphanumeric input device coupled to processor 202 to communicate information and command selections. The keyboard can be a QWERTY keyboard, a key pad, or representations of such created on a touch screen. Cursor control represents a user input device equipped to communicate positional data as well as command selections to processor 202. Cursor control may include a mouse, a trackball, a stylus, a pen, a touch screen, cursor direction keys, or other mechanisms to cause movement of a cursor.

The other applications 228 include other software and routines executable by the processor 202 for various other types of functionality. In one embodiment, one or more application programs are executed by the processor 202 including, without limitation, word processing applications, electronic mail applications, financial applications, and web browser applications.

Computer 108

Figure 3:
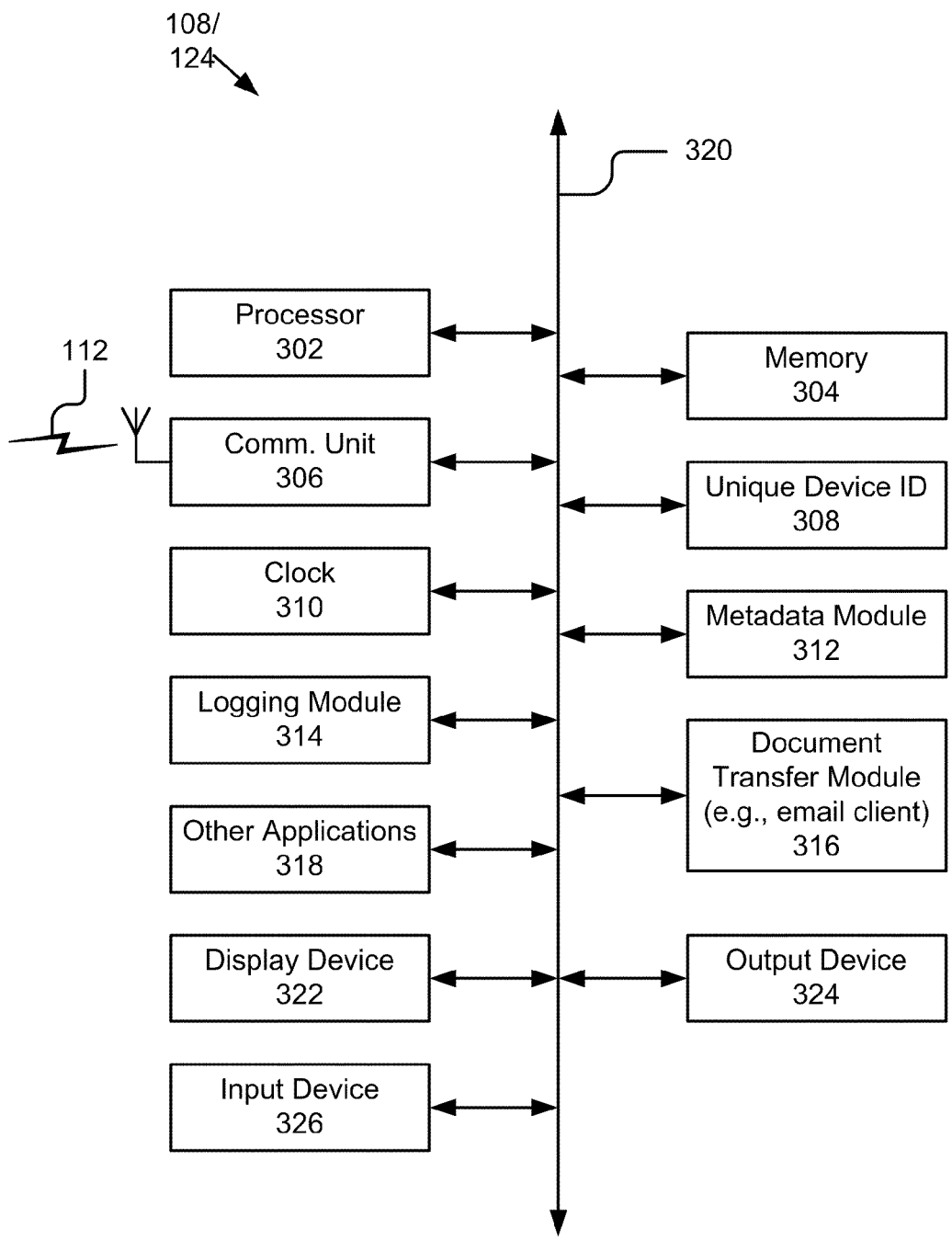
FIG. 3 is a block diagram of an embodiment of a computer in accordance with the present invention.

Referring now to FIG. 3, an embodiment of a computer 108 will be described in more detail. The computer 108 displays an image from a compound document 400 and records any modifications to it including addition of an authorization. The computer 108 comprises a processor 302, a memory 304, a communication unit 306, a unique device identifier 308, a clock 310, a metadata module 312, a logging module 314, a document transfer module 316, other applications 318, a bus 320, a display device 322, an output device 324 and an input device 326.

Those skilled in the art will recognize that some of the components of the computer 108 have the same or similar functionality to the components of the paper-like document server 106 so descriptions of these components will not be repeated here. For example, the processor 302, memory 304, bus 320 and the other applications 318 are similar to the processor 202, memory 204, bus 220 and other applications 228, respectively.

The communication unit 306 is coupled to an antenna and the bus 320. In an alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems.

The computer 108 includes storage for a unique device identifier 308. The computer 108 is coupled to the bus 320 to provide the unique identifier to other components of the computer 108 as needed. In one embodiment, the unique device identifier storage is read only memory for storing the unique device identifier 308. In another embodiment, the unique device identifier storage 308 is a nonvolatile storage storing a "public/private key pair." It is useful for the computer 108 to have a unique identifier that is used to indicate where the document was modified or for various communication protocols. In one embodiment, the unique identifier is the hardware MAC address of a network chip in the computer 108. In another embodiment, the unique identifier is a unique ID associated with a memory card on the computer 108, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA. In one embodiment, the computer 108 is manufactured with or configured with a private key and the public key. Then the computer 108 can use its private key for digital signatures of strokes, images, logs, or other media originating on the device. Others may use the public key to verify such media. The public key may also be used to provide secret communication with the device. Use of the device public key for encryption will limit the access of others to page images or metadata intended sole for a particular computer 108.

The clock 310 is a conventional type and provides an indication of local time for the computer 108. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software and routines for extracting metadata from a compound document and storing metadata to a compound document. In one embodiment, the metadata module 312 are instructions executable by the processor 302 to provide the functionality described below for accessing both image/page metadata as well as document metadata. The metadata module 312 is coupled by the bus 320 to the processor 302 and the memory 304.

The logging module 314 is software and routines for creating and storing local logs in the memory 304, and more particularly, in a nonvolatile storage portion of the memory 304. In one embodiment the logging module 314 is routines executable by the processor 302 to provide the functionality described below. The logging module 314 is particularly critical to provide verification that transactions have been completed. In one embodiment, the logging module 314 also includes routines for publishing or storing in a publicly available location on the network the logs of its particular computer 108. The logging module 314 is coupled by the bus 320 to the processor 302, the memory 304 and the communication unit 306.

The document transfer module 316 is software and routines for transmitting and receiving compound documents as a formatted message from any other computing device such as but not limited to the computer 108, and the paper-like document server 106. The document transfer module 316 is coupled by the bus 320 for communication with the processor 302 and the communication unit 306. The document transfer module 316 is responsible for transmitting and receiving the compound document 400 from computer 108 such as by email, file transfer, XMPP or special purpose application. In one embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computer 108 can be configured to use either. The messages might be in a format that the computer 108 can directly use, e.g. an attachment of image files. The messages might require conversion on computer 108, e.g. a pdf document. Alternatively, a special server could provide conversion of messages so that the computer 108 does not need to support multiple formats. In the case of multiple devices being used in paper-like process to distribute work that must only be done once e.g. as in the departmental in-box described above, using IMAP is advantageous. When a computer 108 needs to send an authorization, a page or strokes or multiple pages and strokes, the computer 108 can again act as an email client and send mail, perhaps with the pages in a directory structure that has been compressed.

In a second embodiment, the document transfer module 316 is a routine for performing file transfer. Various file transfer methods can be used to move documents on and off the computer 108. The computer 108 could also be configured to get or post new documents to an external server, again via ftp, http, rsync, webdav, or another protocol.

In a third embodiment, the document transfer module 316 is a custom application. Of course, information may be transferred to the computer 108 with special purpose applications designed to work with the computer 108 using a specific API.

The display device 322 is a liquid crystal display (LCD), cathode ray tube (CRT), an electronic paper display or any other similarly equipped display device, screen or monitor. The display device 322 represents any device equipped to display electronic images and data as described herein. In different embodiments, the display is binary (only two different values for pixels), monochrome (multiple shades of one color), or allows multiple colors and shades.

The computer 108 includes an output device 324 such as a series of LEDs. This output device 324 indicates status of the device such as: 1) whether the computer 108 has power and is operational; 2) whether the computer 108 has network connectivity; 3) whether the computer 108 is sending or receiving a compound document; etc. Those skilled in the art will recognize that there may be a variety of additional status indicators beyond those listed above that may be part of the output device 324.

The input device 326 includes a keyboard and mouse type controller of a conventional type. In one embodiment, display device 322 is equipped with a touch screen in which a touch sensitive, transparent panel covers the screen of display device 322.

Finally, the computer 108 may include one or more other I/O devices (not shown). For example, the other I/O devices 324 may include speakers to produce sound, microphones to record sound, a scanner or camera to record documents or images, and other sensors or feedback devices like accelerometers, pager motors, or haptic feedback. Optionally, the other I/O devices may include one or more analog-to-digital or digital-to-analog converters, and/or one or more digital signal processors to facilitate audio processing. These other I/O devices are coupled by bus 320 for communication with the processor 302 and the memory 304.

Compound Document 400 Format

The present invention utilizes a compound document 400 to provide a means for storage of the hanko authorization metadata to the user, for authorization and verification. In particular, the compound document format enables rapid display of images on the computer 108, storage of annotations and images created on the computer 108 or other device, and storage of log information to enable verification of the operations performed on the computer 108. In one embodiment, the basic structure of the compound document 400 is a directory of files. Inside the directory are a series of page images, as well as optional metadata. The metadata may be associated independently with each page, and/or metadata may be associated with the document as a whole. Such metadata is stored in further nested directories, and is optional.

Figure 4A:
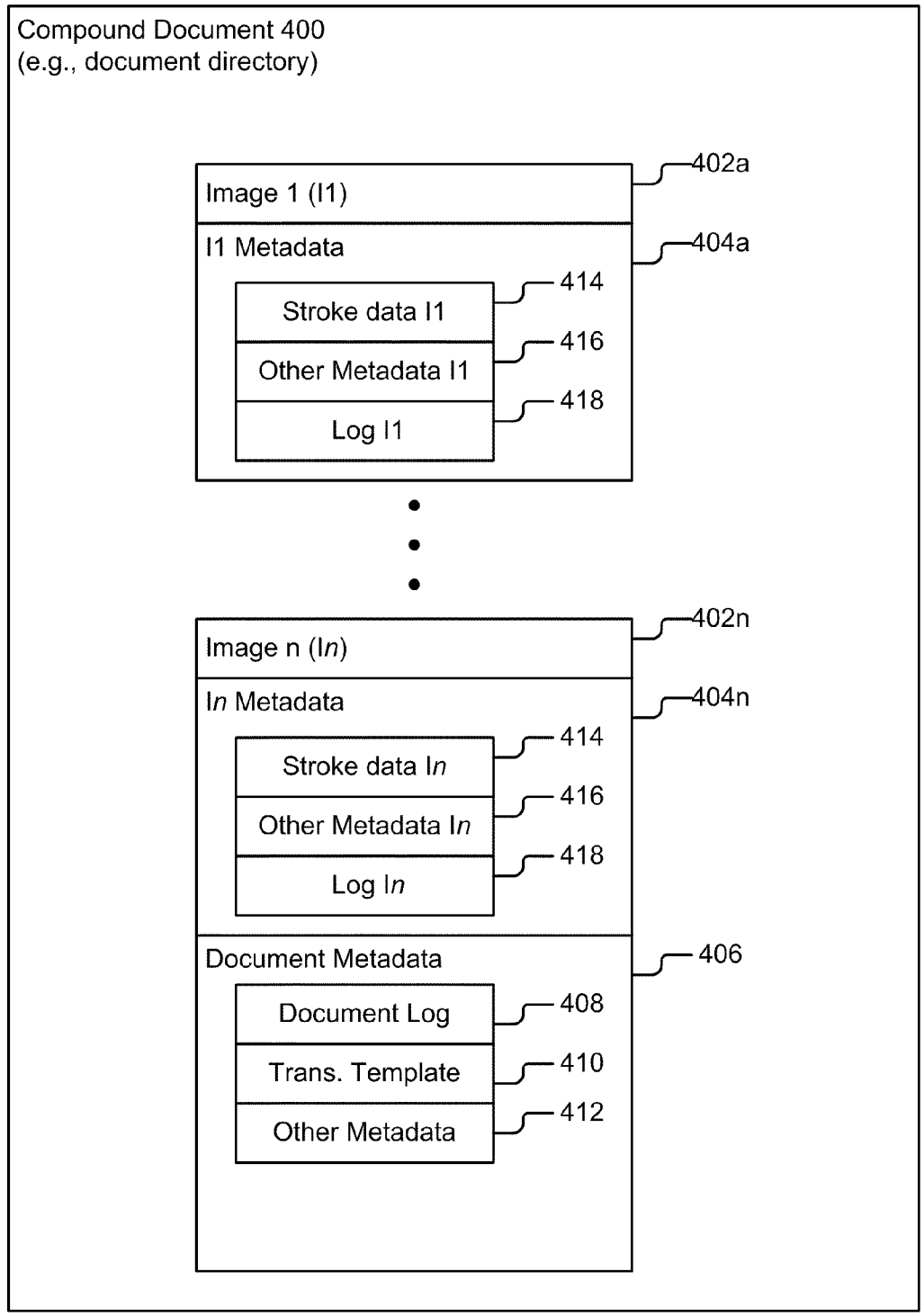
FIG. 4A is a block diagram representing an embodiment of a compound document in accordance with the present invention.

Referring now to FIG. 4A, a graphic representation of the basic structure of the compound document 400 is shown. The compound document 400 as noted above is a directory including one or more files and directories. This is represented in FIG. 4A as the outermost box. In this example, the compound document 400 includes a plurality of images 402a-402n that are denoted in the figure as Image 1(I1) . . . Image n (In). The present invention advantageously stores the pages of the compound document 400 as images. This is particularly advantageous because it avoids requiring that the computer 108 support a wide range of document formats. Providing pure images, i.e. not documents requiring rendering, to the computer 108 ensures a consistent view and eliminates problems with inability to render fonts or other graphical commands. In one embodiment, the images are in one of the following file formats: JPEG, JPEG2000, JPM, PNG, PDF, TIFF or simple PBM (portable bit map) file format. As will be described below, part of the process for creating a compound document 400 includes rendering documents and other formats to one of these simple image formats before the image is received by the computer 108. As noted above, the use of basic and simple images eliminates computation and insures consistent display. Those skilled in all will recognize that the compound document 400 directories can be transferred and stored as standard ZIP format archives.

In one embodiment, the main pages of the compound document 400 are stored at the top level of the directory. The name segment (up to the initial ".") must be unique to that page. In one embodiment, pages are named using UTF-8. Pages may be ordered by sorting the initial name segments into ascending order, using the raw bytes of the UTF-8 representation. In some cases, applications may use document level metadata to allow reordering of pages without changing the names.

Figure 4B:
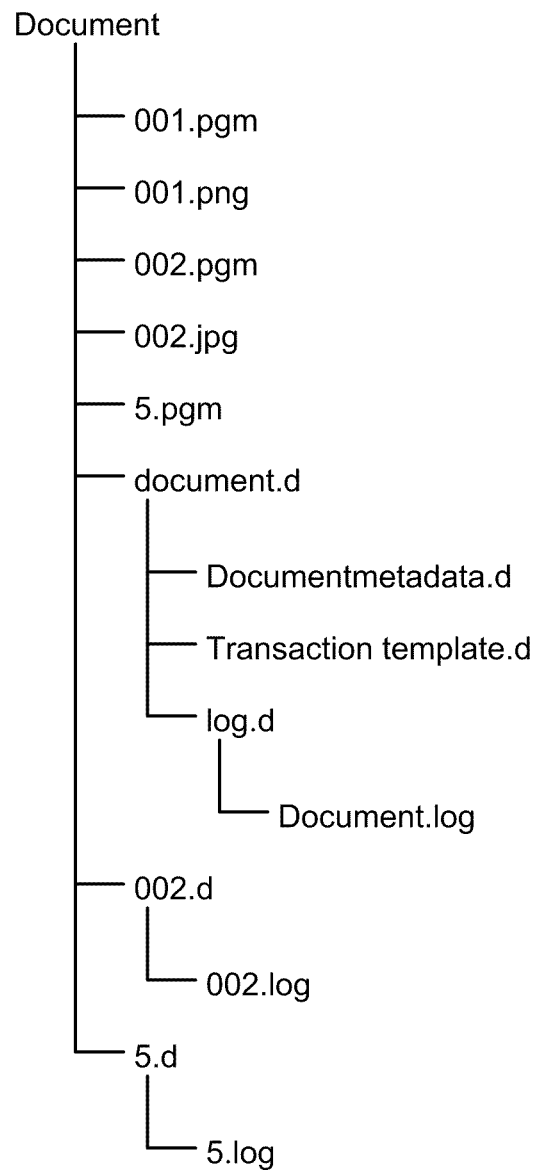
FIG. 4B is a diagram representing one example of a compound document in accordance with the present invention.

Multiple page image files which share the same initial name segment are considered to be alternate representations of the file, of equivalent quality, and display device 322 may choose the representation most convenient for its use. So, for example as shown in FIG. 4B, a directory with the following contents: 001.pgm, 001.png, 002.pgm, 002.jpg and 5.pgm would yield a document with three pages. The first page is represented by one of two files, 001.pgm or 001.png. The second page is represented by one of two files, 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif (Common Intermediate Format) identifies the resolution of the images.

Each of the plurality of images 402a-402n includes associated page or image metadata 404a-404n. The page or image metadata 404a-404n includes stroke data 414, other metadata 416 and log data 418. Furthermore, the entire compound document 400 includes document metadata 406. The document metadata 406 includes a document log 408, a transaction template 410 and other document metadata 412.

The metadata for the compound document 400 is represented by files stored in directories, which are associated with either the document as a whole or with individual pages. In one embodiment, the metadata directories have the suffix ".d" as the final pair of characters in the directory name. (For example, see FIG. 4B) Information within a metadata directory is stored in a file or subdirectory, which is expected to have a unique name segment. Organizations are encouraged to name them using unique identifiers—for example, the traditional Java reversed domain name method. A metadata directory may itself contain subdirectories, whose contents are ordered and defined according to the creator of that directory. General policy is that applications which do not understand the contents of a metadata file or directory should preserve the contents and should not alter it. A given metadata file or directory is self contained, there should not be any dependencies between items of metadata unless they are contained in the same directory. Items of metadata are connected either to the document as a whole, or a specific page.

In one embodiment, the document metadata 406 is global metadata and is stored in a directory named "document.d" containing one or more files. This directory is included at the top level directory. (For example, see FIG. 4B) It is useful to store a log of actions associated with a document in the document metadata. In one embodiment, the system 100 also stores a version of an "original" document as document metadata. For example if the compound document was formed from a PDF, Microsoft Word, Microsoft Excel or other document, the original format document may be saved in the metadata directory.

In one embodiment, the page or image metadata 404 is named with the same name segment as the page image, and ends in the extension ".d". For example, if the page image is named "page.001.jpg", the page metadata directory should be named "page.001.d" to indicate that it is associated with that page. Additional examples are shown in FIG. 4B. In another embodiment, the page or image metadata 404 includes the original image in some format for each page in the page metadata directory. This metadata is created as soon as the compound document 400 is created e.g. by storing a raster format both at the top level directory and in the page metadata directory, or a copy of the original raster format may be stored when the page image is first changed. In other embodiments, the page or image metadata 404 includes log data 418 as will be discussed in more detail below. This log data 418 represents a log for changes applied to each page in the metadata directory for the page. The other metadata 416 is used to store any other data related to a particular page or image. For example, if images are added to a page, it is useful to store these added images in the page metadata directory 416. An image might be added to a page for reasons similar to "stamping" a paper page, e.g. "received" or "submitted" thus providing a visual indication of the status of the page to any reader.

The stroke data 414 stores stroke information for any strokes that are applied to a page in the page's metadata directory 404. This is the most important information captured by a computing device or computer 108 that accepted stroke input. In the simplest form, a stroke is just a list of x-y locations where the stylus, pen or other pointing device, like a finger, was sensed. This information is associated with the background image that was showing when the strokes were written and it should be possible to scale and orient the strokes so that it is later possible to match what the user saw. In addition to the x-y locations, it can also be valuable to capture the time of each stroke or each point, the pressure of the stylus, which stylus was used or which end of a stylus was used (if the hardware supports this). It may even be useful to store information about the algorithm being used on the pen to convert pen strokes into pixels e.g., what width and color pen lines are being drawn in, and how points are selected between sensed points.

This information about strokes can be stored in a variety of ways. In a first embodiment, it is stored as simple text based lists comprising an x-value, a space, a y-value and a line feed, with the end of a stroke indicated by a point outside the drawable space, e.g. (−1,−1). For example, the pad might allow x coordinates between 0 and 1200 and y coordinates between 0 and 1600, a point recorded as "−1,−1" is not in the drawable space and can be used to terminate the stroke. In a second embodiment, strokes are stored as using a binary storage technique allocating the appropriate number of bits or bytes to each point, e.g. 2 bytes per x coordinate and 2 bytes per y coordinate, this is more memory efficient. In a third embodiment, the stroke data is stored as InkML. InkML is an XML format that allows storage of strokes and a variety of additional data, specified by the W3C and is described in the technical report, Ink Markup Language (InkML), W3C Working Draft 23 Oct. 2006 InkML allows some memory efficiency as well, and if necessary the data can be compressed by a text compressor.

The transaction template 410 is a standard metadata item of the compound document 400. The transaction template 410 either includes a list of service transactions or is a URL pointing to a description of service transactions. When the compound document 400 is to be processed by the central scheduler 208, then the transaction template must be attached to the compound document 400. Over the life of the compound document 400, more than one transaction template, and the associated processing, might be applied. The most recent transaction template is always used for processing. The transaction template includes a list of entries, each of which is defined as follows: 1) a step identifier including: an input type, an output type, and a preferred service provider.

The step identifier is a string which uniquely identifies the particular processing step. For example, it might simply be the numeral string "001" or it might be a more descriptive string "handwriting recognition step". It MUST be unique within the scope of the transaction template. Input types and output types identify which formats of information are needed by the service and must be included in the compound document 400. Both input types and output types are lists of type specifications. These type specifications are unique identifiers for data in a certain format performing a certain role. Each type specification includes a pair of strings identifying the format and role of the information. The format field SHOULD contain an ACCEPTED RFC822 MIME type. The role field is another string identifier, and should contain a globally unique identifier for a role, agreed upon by providers and customers. An example of a complete type specification might be format: "text/plain" role: "Recognized Handwriting." It should be obvious to one skilled in the art that many other fields of information might be added to a transaction template entry. For example, instead of specifying a particular vendor, the step might specify the cheapest vendor from an approved list. Another embodiment might specify the cheapest service provider whose quality meets an acceptable rating threshold based on customer feedback rankings The format field of a type specification includes one MIME type, or might contain a list of such types. In such a case, any of the listed types is considered acceptable by the service provider. An input type list might contain one of more of the type specifications described above. In such case, the service provider 124 wishes to receive all of the listed types included in the compound document 400. A special type specification (special because this information is not represented in the metadata) represents the base page images for the document. This type specification should look like: format: "image/jpeg, image/jp2, image/tiff, image/gif, image/x-portable-anymap, image/x-portable-bitmap, image/x-portable-graymap, image/x-portable-pixmap" role: "edo.baseimage"

Log Files 408, 418

A particular advantage of the present invention is the ability to verify the actions performed by the computer 108 or the paper-like document server 106. The ability to verify actions is enabled by the creation and maintenance of log files 408, 418. The present invention creates a log or log file 408, 418 with a set of entries that describe changes made to a compound document 400. The present invention records any actions instigated by a human on a computer 108 which resulted in a changed appearance to the displayed document. Since the computer 108 is used to allow humans to modify documents in the workflow, it is useful to record what writing was done on what image or pages at what time on what device and if known by whom and in what location. The present invention utilizes log files 408, 418 with two important properties: 1) sufficient information is referenced by the log 408, 418 to recreate the state of the document, at minimum its visual appearance at the point of log writing and 2) the log file is "tamper evident."

The present invention generates logs 408, 418 that are tamper evident by maintaining a sequence of cryptographic hashes of log entries. The cryptographic hashes associated with each log entry hash data including the cryptographic hash of the previous log entry. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in co-pending U.S. patent application Ser. No. 11/322,435 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are incorporated by reference in their entirety. The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are incorporated by reference in their entirety. Thus logs containing cryptographic hashes or content based identifier (CBI) are maintained. The content based identifier (CBI) of the recent log entries are stored in other log files and published via email or other protocols. These CBIs can later be used to verify that the log was not modified since the time the CBI was published.

Maintaining logs 408, 418 which allow recreation of the document at any point is done by storing the type of operation performed on the document and the CBI for any data needed to redo the operation in the log file. The data itself is stored in metadata directories 404, 406 for the page and document.

The logging module 210, 314 stores information about visual changes on a page such as: page creation, writing on a page, and adding an image to a page. The logging module 210, 314 also stores when a page is submitted or otherwise copied from the computer 108 to another place. When a page is created, a raster form of the image is saved in the metadata directory 404 for the page. The page log 418 is initialized with a 'start log entry.' The start log entry includes the current time as measured on the computer 108 and might include a CBI from another log to establish that the page was created after the time of that CBI (this is a 'freshness hash'). In addition to the 'start log entry,' the logging module 210 stores a 'page created' entry that includes the hash of the raster form of the starting image.

If the CBI of the page log 418 is published after the page is created, then it is possible to use that CBI to check if the page log 418 has been tampered with. If the page log 418 has not been modified, then the steps in the log 418 can be followed. At first the only entry is the 'page created' entry. The CBI for the page image can be checked, and if it matches the raster image in the page metadata directory 404, then the format of the initial page is known not to have been tampered with since creation.

When strokes are added to page, they are displayed in raster format on the display device 322, and they are stored in a stroke file 414 in the metadata directory 404 for the page. A log entry is added to the page log 418, typically including the time and the CBI for the stroke file 414. Thus at a later point, if the log 418 is verified, then the stroke file 414 can be verified and the background image can be verified, if all of these items have not been modified then the stroke file 414 can be used to redraw the strokes on the background image, thus recreating the page as it looked after strokes were added.

Note that to maintain pixel accuracy, the present invention uses a known algorithm to convert the stroke file 414 to pixels. If multiple algorithms are used, or an algorithm is used with some parameters, e.g. stroke width, then the entry for 'strokes added' should include information identifying the exact algorithm used and the parameters to that algorithm.

Just as strokes may be added to a page, images may be added to a page. In this case the image added to a page should be stored in raster format in the page metadata directory 404. The operation 'image added' and the location where the image was added to the page, e.g., (500,300) should be stored in the log 418, along with the CBI of the raster form of the image.

Many "applications" can operate on the computer 108 that only update pages by adding images or adding strokes. If additional changes are made to the page then log entries for these operations must be defined, the name of the operation must be stored in the log 418, and the hash of the data must be stored in the log 418. When a log entry is added to a log 418 the unique identifier 308 of the computer 108 is included in the entry. If a device is configured with a private key, then it might provide a digital signature of the stroke file 414 to indicate that the stroke file 414 was captured on that computer 108. This signature is included in the log 418.

Just as a page log 418 is created in a metadata directory 404 when a new page is created, the logging module 210 creates a document log 408 in the document metadata directory 406 when a document is formed. This document log 408 is used to record items including the addition of pages to a document, when pages are viewed, and when the document as a whole is submitted. Also changes to document level metadata 406 are recorded in this document log 408. While it is possible to repeat the information stored in a page log 418 in the overall document log (along with a page identifier), the logging module 210, 314 records just the CBI for the last entry in page log 418 when the page log 418 is updated. By storing the CBI from the page log 418 in the document log 408, the document log 408 is used to verify all the page logs 418. The CBI from the document log 408 is then published by email or other method, rather than needing to publish information from each individual page log 418.

Entries in the document log 408 are similar to the page logs 418: they should include an 'operation' and the CBI of any data necessary to complete the operation. In the case of a page view, the log entry includes the identifier for the page, along with the CBI of the current raster format of the page image. Note that some log formats allow the direct inclusion of text and CBIs in the same log entry, while other log formats only allow CBIs. In the event the log format only allows CBIs, the text for the 'operation' is stored in file in the document metadata directory 406 and the CBI of that file included in the log. When the 'operation' has no parameters, e.g. 'strokes added' then the same file with the text of the operation can be stored once in the metadata directory and the CBI used multiple times. Of course the CBI of the actual stroke file is expected to differ in most cases.

Processing by the Central Scheduler 208

Depending on the embodiment, this functionality is performed either by the central scheduler 208 of the paper-like document server 106 or by the processor 302 of the computer 108. For convenience and ease of understanding, it is described below as being performed by the central scheduler 208.

In one embodiment, the computer 108 is configured to work with a particular paper-like document server 106 and submit a page, image or compound document 400 to the paper-like document server 106. This submission begins paper-like processing managed by the central scheduler 208 of the paper-like document server 106. The paper-like document server 106 then determines the next step based on pre-programmed rules.

If the documents are being transported in a manner that supports page images, strokes, and metadata, then the metadata includes the workflow instructions and status. Again, in the simple case, the metadata includes date, time, serial number, hash of document+image, rolling hash from seal capture device, and a log server file pointer. For the compound document 400 described above, this workflow information could appear in a page metadata directory 404 or a document metadata directory 406.

Seal Capture Device 130

Figure 5A:
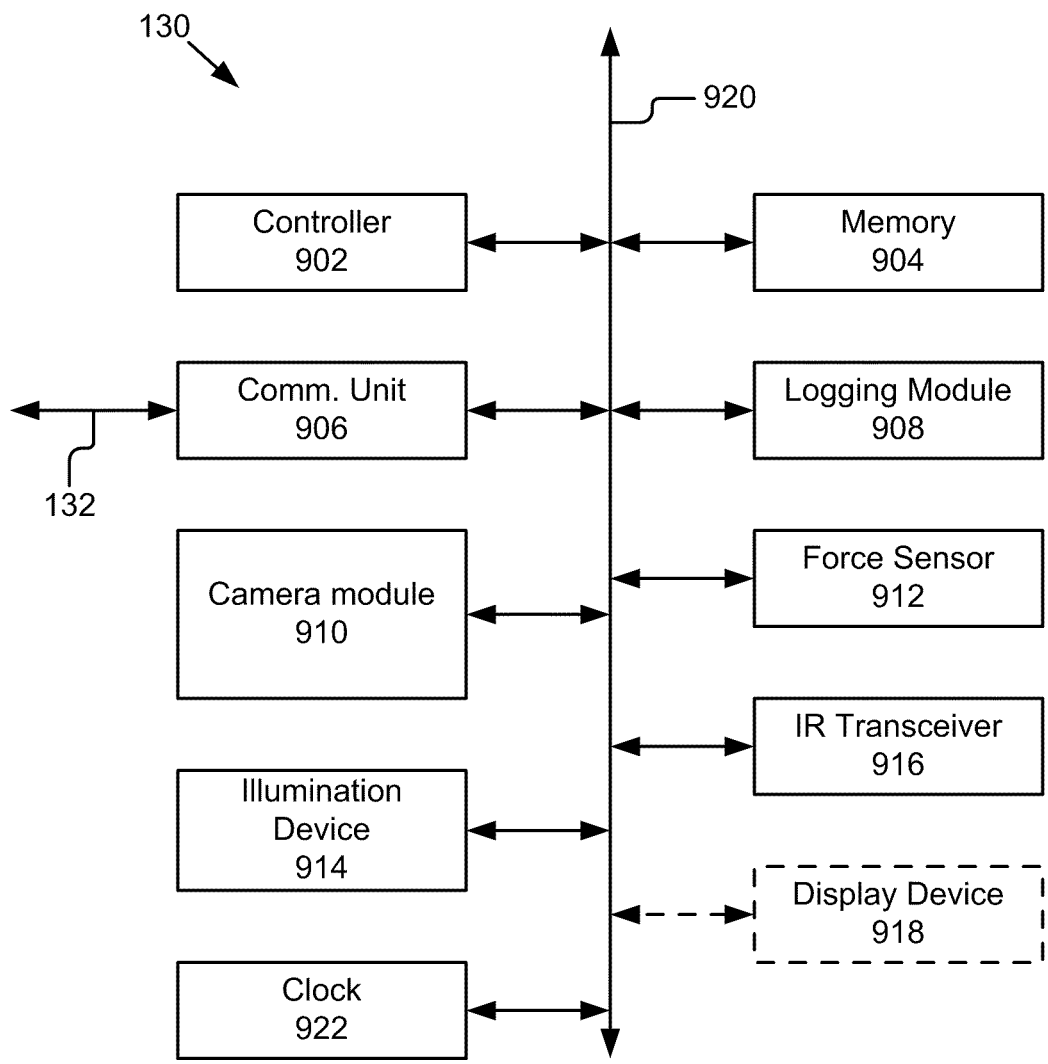
FIG. 5A is a block diagram of an embodiment of the seal capture device in accordance with the present invention.

Referring now to FIG. 5A, one embodiment of the seal capture device 130 is described. The seal capture device 130 comprises a controller 902, a memory 904, a communication unit 906, a logging module 908, a camera module 910, an optional force sensor 912, an illumination device 914, an optional infrared (IR) transceiver 916, a bus 920 and a clock 922. In another embodiment, the seal capture device 130 also includes a display device 918. The display device 918 is optional as indicated by dashed lines in FIG. 5A.

The controller 902, the memory 904, the communication unit 906, the logging module 908, the bus 920 and clock 922 are similar to the processor 302, the memory 304, the communication unit 306, the logging module 314, bus 320 and clock 310 of the computing device 108, respectively, so that description will not be repeated here. It should be noted however that the controller 902 may be computationally less powerful, the memory 904 may be smaller, and the communication unit 306 will be most efficient as a USB interface. The logging module 908 performs similar logging functions so that the seal capture device 130 maintains a record of prior physical seals 134 captured by the seal capture device 130. This record can be maintained as a rolling hash, which is a continual hash function computed as a function of all previous hashes plus the new hash presented to it.

The camera module 910 is of a conventional type and includes a lens, an image sensor and associated digital processor. In one embodiment, the image sensor is a charge coupled device (CCD) or CMOS active pixel sensor. A camera interface couples the camera module 910 to the controller 902 via bus 920.

The force sensor 912 or detector is a switch or similar device used to detect the stamping or pressing of the physical seal 134 on the top of the seal capture device 130. The force sensor 912 is coupled to the controller 902 and generates and sends a signal indicating that the physical seal 134 has been pressed upon or stamped on the seal capture device, and that the illumination device 914 should be activated and an image should be captured by the camera module 910.

The illumination device 914 is a light or LED for illumination of the area upon which the physical seal will be stamped. This ensures that a high quality image of the physical seal 134 is captured by the camera 910. The illumination device 914 is coupled by the bus 920 the controller 902 for activation and deactivation of the illumination device 914. The illumination device 914 can attempt to illuminate the seal directly, or can be employed to make clear shadows of the relief of the image of the seal, which are easily cleaned up by the controller 902 so that a clear image of the seal can be obtained with a minimum focal distance of the device.

The infrared (IR) transceiver 916 is another method of detecting the presence of the seal on the seal capture device 130. Either the force sensor 912 or the IR detector 916 can be used. Most of the time, the IR signal will be generated by the device 916, with no return reflection because there is no seal present. However, when a seal is present, IR energy will be reflected off of the seal back into device 130, and sensed by IR transceiver 916. IR transceiver 916 can send a signal to the controller 902 indicating that the physical seal 134 has been pressed upon or stamped on the seal capture device, and that the illumination device 914 should be activated and an image should be captured by the camera module 910. The infrared transceiver 916 is coupled by the bus 920 to the controller 902. Those skilled in the art will recognize that there are other options available for the detection of a physical seal 134 being pressed onto the seal capture device 130. This description, which provides two such methods, is not limited to the implementation of these two methods alone.

As noted above, the seal capture device 130 may optionally include the display device 918. The display device 918 is used to present an image of the electronic document being authorized or stamped. In one embodiment, the controller 902 communicates with the computer 108 to receive the image currently being displayed. This image is then presented by the controller 902 on the display device 918 so that is viewable by the user. The use of the display device 918 as part of the seal capture device 130 is particularly advantageous because it provides feedback to the user to ensure that the document being authorized is the document that the user in fact intends to authorize. Optionally, this display device 918 can be coupled with or replaced by a receipt printer so that the user will have a receipt each time a seal is applied to the seal capture device 130. The controller 902 thus presents the image on the display device 918 before and during the period when the user stamps the physical seal 134 on the seal capture device 130. Depending upon the size of the image, and the size of the display, either the entire document image can be displayed, or a subset region of the document can be displayed. The key is to make it clear to the user which document is being approved at the time of the seal capture. The display device 918 is coupled by the bus 920 to the controller 902.

Figure 5B:
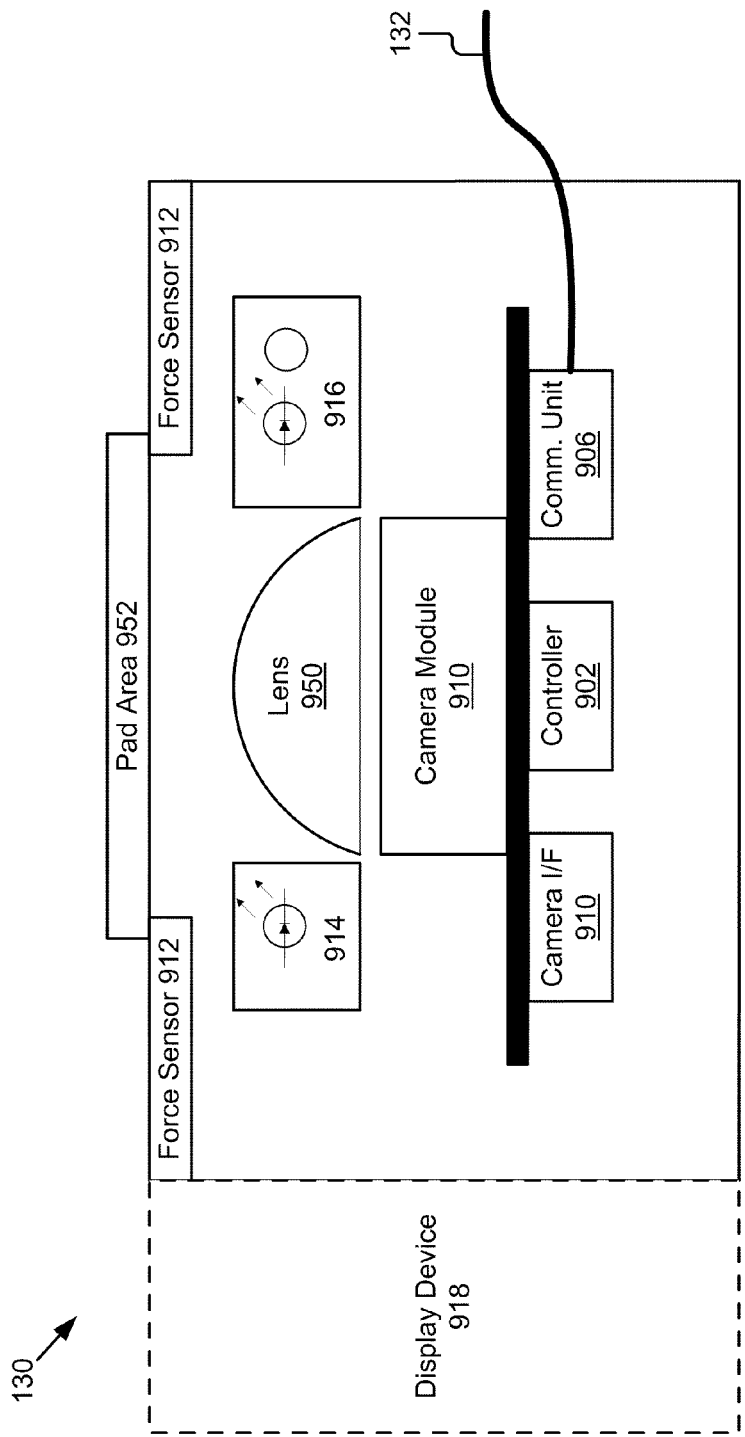
FIG. 5B is a block diagram of another embodiment of the seal capture device in accordance with the present invention.

Referring now to FIG. 5B, another embodiment of the seal capture device 130 in accordance with the present invention is shown. This embodiment includes many of the same components as the first embodiment described above with reference to FIG. 5A. Thus similar reference numbers are used for components that have the same or similar functionality as has been described above with reference to FIG. 5A. As shown in FIG. 5B, this second embodiment of the seal capture device 130 includes the controller 902, the communication unit 906, the camera interface and camera module 910, the force sensor 912, the illuminating device 914 such as an LED, the IR transceiver 916, a lens 950 and a pad area 952.

As can be seen in FIG. 5B, the pad area 952 is disposed on top of the seal capture device 130. In one embodiment, the pad area 952 is a transparent material such as glass. Just beneath the pad area 952 is the force sensor 912 that detects when the pad area 952 is forced downward. Although not shown in FIG. 5B, the force sensor 912 is coupled to provide an event signal to the controller 902. Disposed beneath the pad area 952 are the illuminating device 914 and the lens 950. The camera module 910/lens 950 combination can be auto-focus, but typically will be fixed focus because of the constrained optical geometries of the system. The illuminating device 914 is positioned such that light is directed towards the bottom of the pad area 952 to ensure that the physical seal 134 is illuminated when applied to the pad area 952. The lens 950 focuses the image on the bottom of the pad area 952 upon the camera module 910. The infrared transceiver 916 is positioned below the pad area proximate the lens 950 for sensing the presence of the physical seal, by emitting IR energy and detecting if any is reflected/returned from the seal back into the capture device 130. The communication unit 906 is coupled to signal line 132 to send images and metadata to the computer 108, and receive images from the computer for display.

Figure 6:
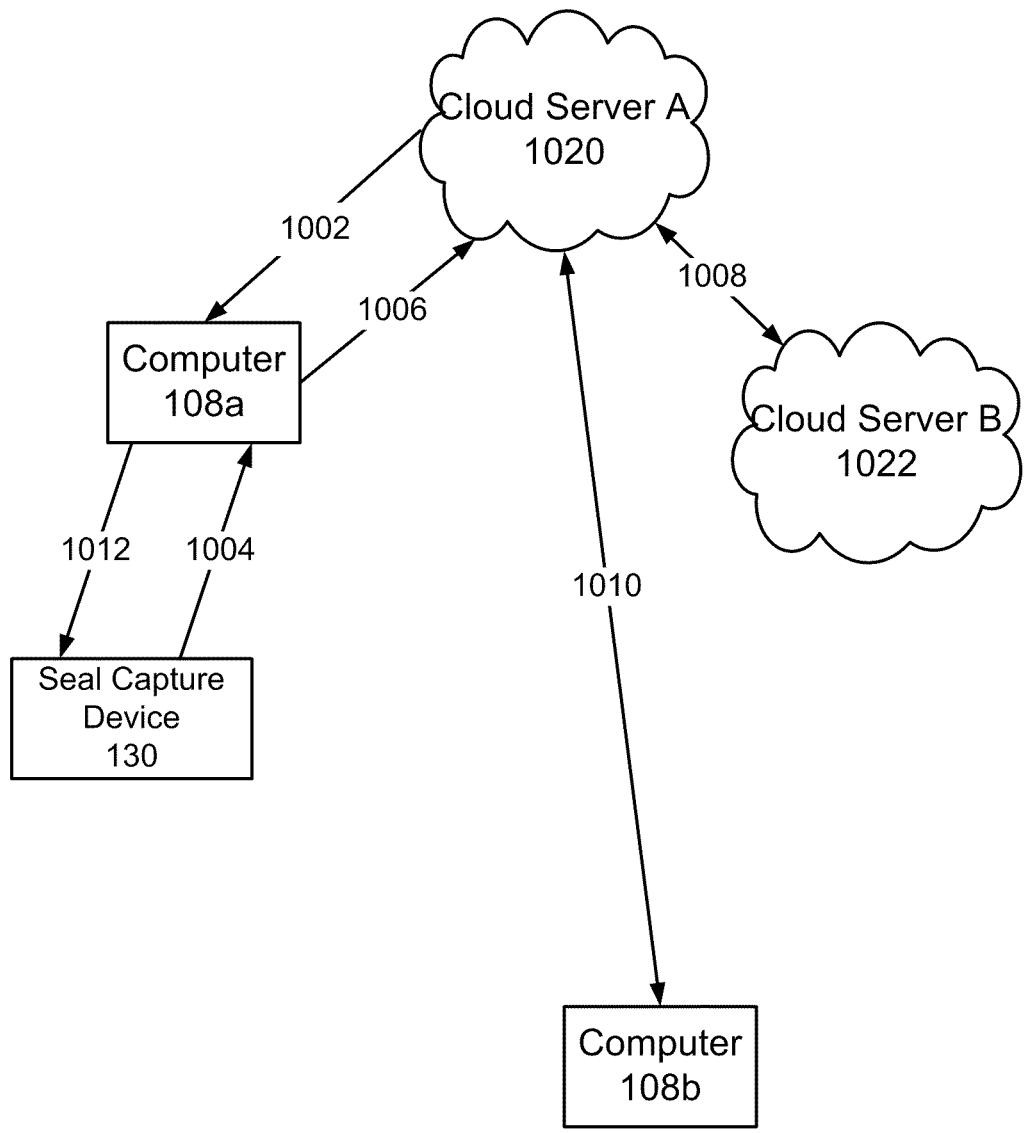
FIG. 6 is a block diagram showing the data paths for transfer of seal images and metadata in accordance with the present invention.

FIG. 6 shows an example of the data paths for transfer of seal images and metadata in accordance with the present invention. As part of the electronic or digital document workflow, an image or compound document 400 is sent 1002 from a cloud server 1020 (e.g., the paper-like document server 106) to the first computer 108a. The user working on the electronic workflow retrieves the compound document 400 and displays any image of the document on the display of the first computer 108a. The user authorizes the electronic document being displayed and stamps his/her physical seal 134 on the seal capture device 130. This generates an image of the physical seal 134 and metadata. Metadata includes information such as the time and date when the physical seal was stamped, and the serial number of the seal capture device 130. The seal capture device 130 then sends 1004 the image of the physical seal 134 and the metadata to the computer 108a. Prior to sending the image of the physical seal and the metadata to the computer 108a, the seal capture device 130 can optionally perform some clean-up of the image (remove background of the stamp image so as to only retain the salient part of the stamp's footprint, for example.), or it could be performed in the computer 108a after the raw image is received. In another embodiment, such process is done by the computer 108a before applying the stamp image on the document thereby keeping the sensing device 130 simpler. The computer 108a then overlays the image into the document, preferably over certain text areas of the document. The computer 108a then computes a document hash, which is a hash of the document itself including the overlaid seal image 1004. This document hash becomes an additional part of the metadata. At this point, computer 108a sends this hash back to the seal capture device 130 through the channel 1012 and device 130 creates a rolling hash, which is a hash function of all previous hashes sent to device 130 combined with this new hash. The seal capture device 130 stores a copy of the new rolling hash and sends it back to computer 108a via link 1004, where it is added to the metadata. This metadata now includes all or parts of: date, time, serial number, hash of document+image, and rolling hash from device 130, plus a pointer to a log server to be used to securely store the data. In one embodiment, the first computer 108a stores this metadata information as an entry in a local log file, and also prepends it to the document itself as part of the image header. The first computer 108a also uploads 1006 the metadata for storage in the cloud server 1020. Note that there is no reason to upload the seal image, or the document, to the server 1020—in fact, it is more secure not to upload any image data to the server; just the metadata is required. From time to time, the cloud server 1020 sends 1008 information stored in its logs to another cloud server 1022 to entangle them for added security and trust from the users. At some later time, another user using a second computer 108b interacts via 1010 with the cloud server 1020 to verify the document authorization. The methods for applying the authorization and verification are described in more detail below with reference to FIGS. 7 and 8.

Figure 7A:
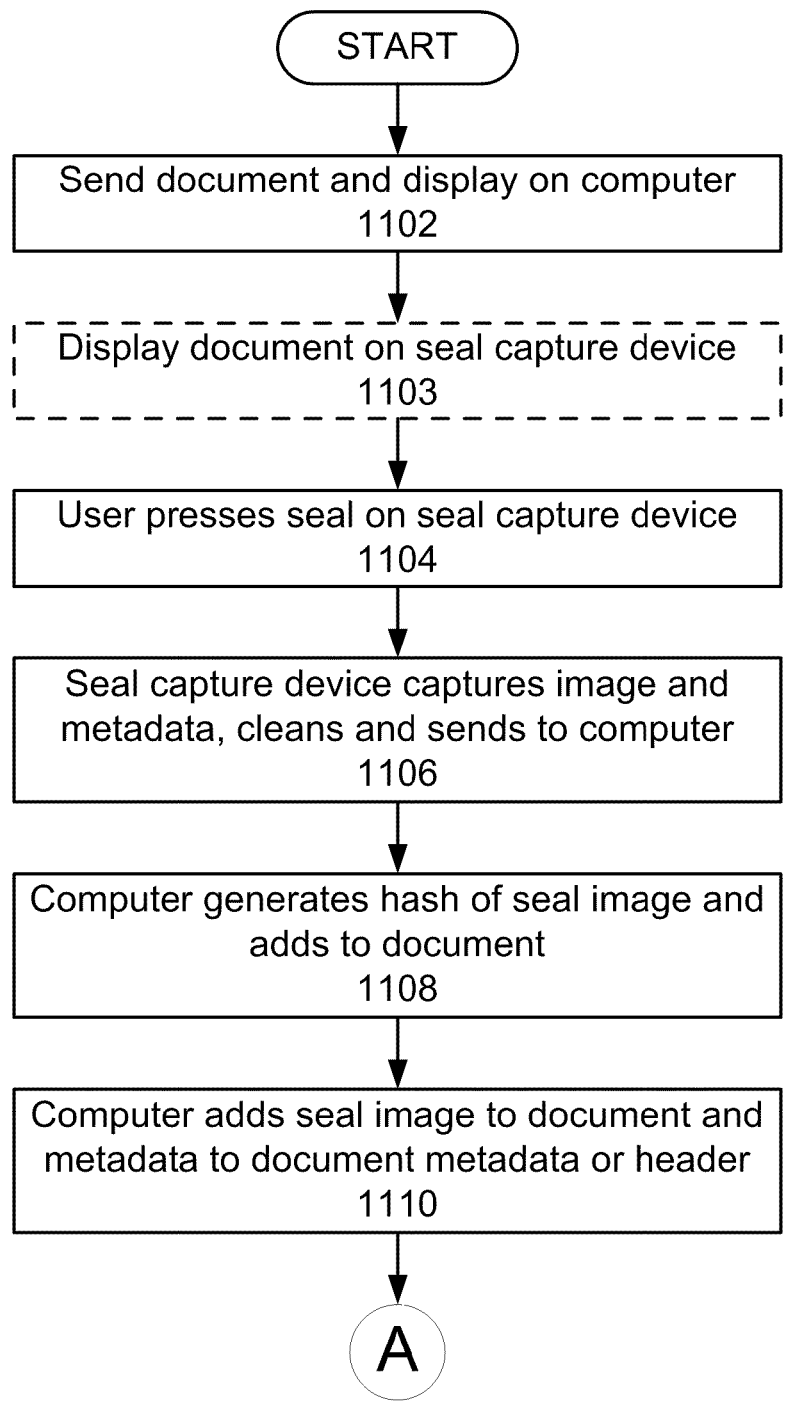
FIGS. 7A and 7B are a flowchart of an embodiment of a method for applying a physical seal authorization to documents in electronic workflows in accordance with the present invention
Figure 7B:
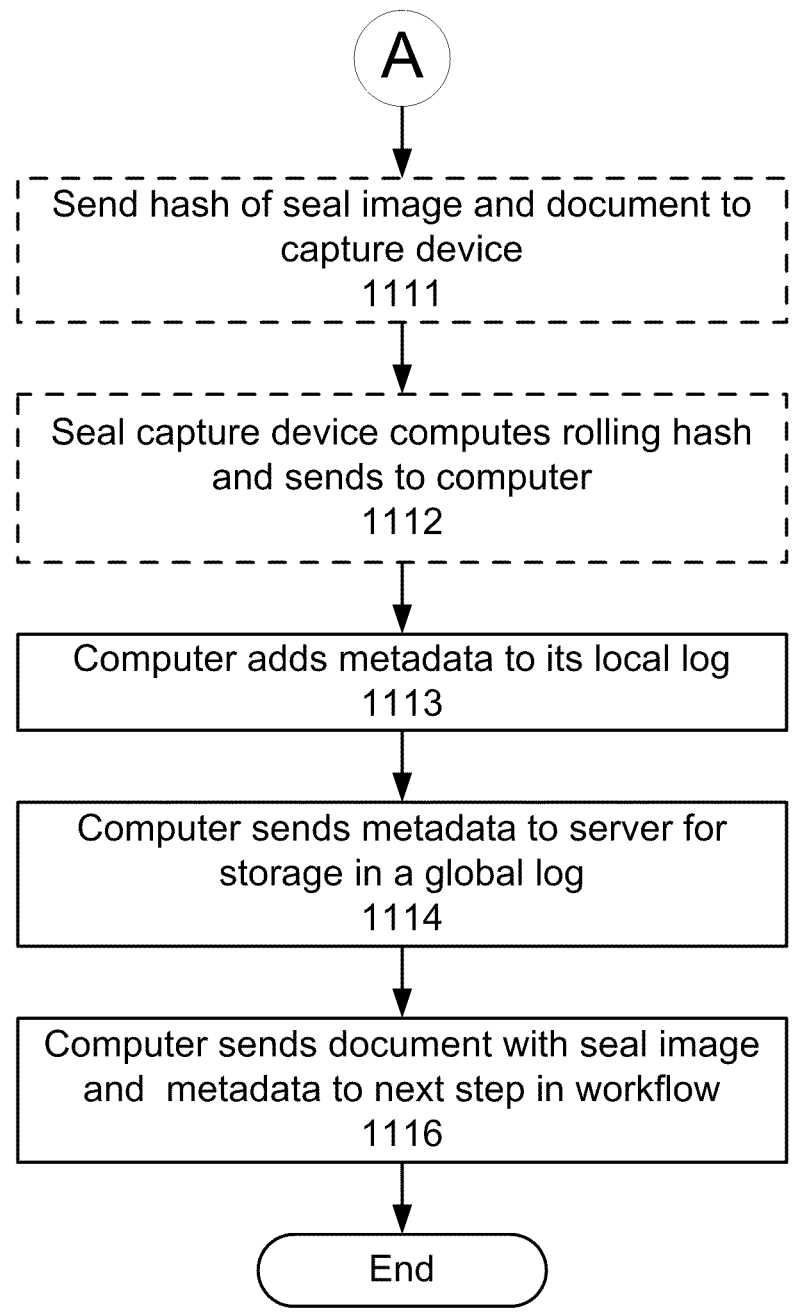
Figure 9B:
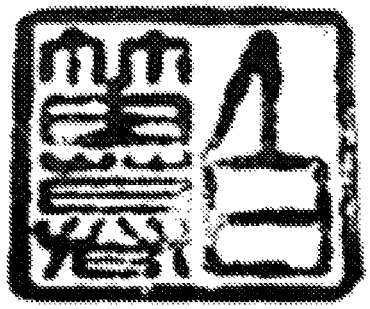

Referring now to FIGS. 7A and 7B, an embodiment of a method for applying a physical seal authorization to documents in electronic workflows is described. The method begins, when as part of an electronic workflow, a compound document 400 is sent 1102 to the computer 108, and images from the compound document 400 are displayed on the computer 108. A graphic representation of an example form image is shown in FIG. 9A. In one embodiment, the image is also sent to the seal capture device 130 and displayed 1103 (in whole or in part) on its display device 918. Next the user physically presses 1104 his/her seal 134 onto the seal capture device 130. A graphic representation of an example seal is shown in FIG. 9B. The seal capture device 130 senses the pressing of the seal 134 with the force sensor 912 or IR detector 916 and illuminates the pad area 952 using the illumination device 914. The seal capture device 130, in particular the camera module 910, captures 1106 an image of the physical seal 134 and other metadata. For example, the metadata includes date, time and serial number (or unique identifier) of the seal capture device 130. In one embodiment, the seal capture device 130 could also perform a background cleanup procedure so as to retain only the salient features of the seal's footprint (optionally, this cleaning procedure could be performed in the computer 108). The seal capture device 130 then sends 1106 the image of the physical seal 134 and the metadata to the computer 108. The computer 108 receives the metadata and image of the seal from the seal capture device 130 and computes 1108 a hash of the image of the seal and the document. The computer 108 adds 1110 the image of the seal, the hash and the metadata to the compound document 400, typically overlaying the image of the seal on some text in the document. In other words, the image of the physical seal 134 is added to the image of the document so it's visible, and the metadata is added to the document header so it's invisible. In one embodiment, the metadata added by the computer 108 is a hash of the compound document 400 including the cleaned and merged seal. In another embodiment, the metadata added by the computer 108 is a rolling hash which is a hash of the previous rolling hash plus the new approved document hash (to be explained in FIG. 7B). Next as shown in FIG. 7B, the computer 108 optionally sends 1111 the hash of the image of the seal and the document to the seal capture device 130. Then the seal capture device 130 optionally takes this hash, adds 1112 it to its internal rolling hash, sends back to computer, to be a part of the metadata. Next, the computer 108 adds 1113 the metadata to its local log. As this point, the metadata includes date, time, serial number, hash of document+seal image, and the rolling hash from seal capture device 130.

Then the computer 108 sends 1114 the metadata to the paper-like document server 106 for storage in its global log.

In one embodiment, the metadata sent to the server 106 includes metadata such as the document hash, the date, the time, the serial number of the seal capture device 130, the rolling hash of the seal capture device 130 and log file server pointers (e.g., pointers to the log servers such as a http address). In another embodiment, the compound document 400 which includes the original image and the image of the seal to the paper-like document server 106. The method completes by sending 1116 the compound document 400 with the seal image and the log information to the next step in the workflow. A graphic representation of an example document image and seal image is shown in FIG. 9C.

Figure 8:
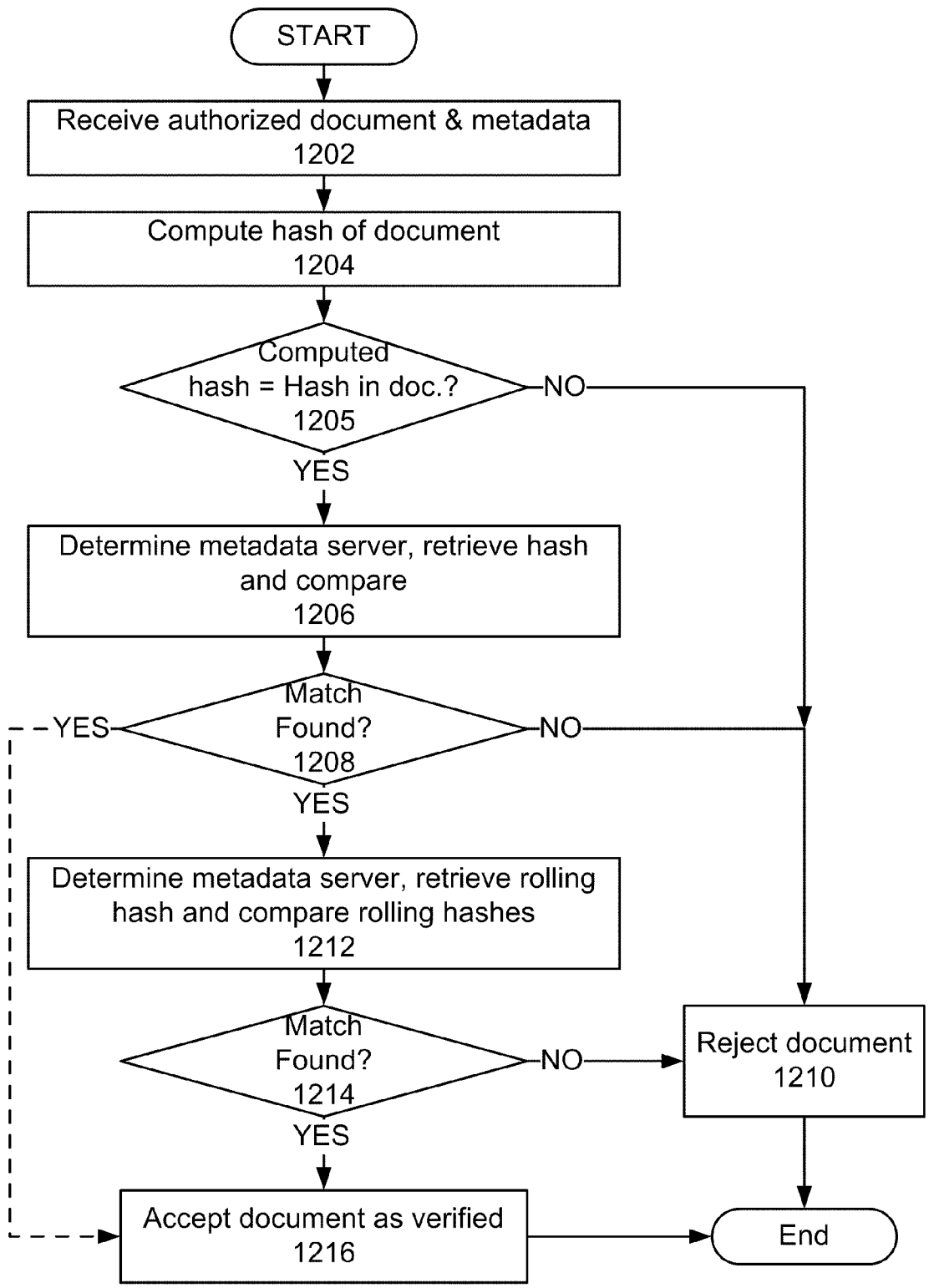
FIG. 8 is a flowchart of an embodiment of a method for verifying a seal that has been added to an electronic document in accordance with the present invention.

Referring now to FIG. 8, an embodiment of a method for verifying a seal that has been added to an electronic document is described. The method begins when the computing device such as the computer 108 receives 1202 an authorized digital document with metadata, for example a compound document 400. Next, the method computes 1204 a hash of the authorized digital document. In particular, the hash is computed of the digital document including the image of the seal, excluding the metadata. First, the method looks for a matching hash contained in the metadata of the document. The hash in the metadata of the document is compared 1205 to the computed hash for a match. If the hashes match, the method continues in step 1206. If not, the method continues to step 1210 to reject the document. In step 1206, the method determines the metadata server (e.g., paper-like form server 106 or cloud server 1020) associated with the digital document, retrieves the hash for the document and compares it to the hash computed in step 1204. In one embodiment, the digital document includes metadata pointers that can be used to identify the corresponding metadata server and other locations at that server where the corresponding hash value for the document has been stored. Next, the method determines 1208 whether the comparison is a match. If not, the method continues to reject 1210 the document and the process is complete. Since the hash values either do not match or cannot be found at the metadata server, the authorization on the authorized digital document is fraudulent, and the authenticity cannot be verified so the document is rejected. On the other hand, if the hash values can be found and match, the method continues from step 1208 to step 1212. In an alternate embodiment with minimal security, the method transitions from step 1208 to step 1216 as delineated by the dashed line from step 1208 to 1216 and the additional security provided by steps 1212 and 1214 need not be performed. In step 1212, the method determines the metadata servers for the compound document 400, retrieves the rolling hash for the compound document 400 from the document metadata, and compares it to the rolling hashes stored at other metadata servers. This process is similar to that described above with reference to step 1206; however, it includes the added complexity that the rolling hashes of the entangled servers are compared in contrast to just a single entry that may be stored in a single server. Next, the method determines 1214 whether a match was found in step 1212. If not, the document is rejected in step 1210 as not being genuine as has been described above. On the other hand, if a match is found in step 1214, the document is verified as genuine and accepted, and the method is complete and ends.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A capture device comprising:
    a detector for sensing pressure from application of a physical seal to the capture device, the detector generating a signal for activating illumination and capturing an image of the physical seal in response to the physical seal being pressed upon the capture device;
    an image sensor for capturing the image of the physical seal in response to the signal, the image sensor having an input and an output, the input of the image sensor in communication with the detector to receive the signal and the output of the image sensor in communication with a controller to provide the image of the physical seal; and
    the controller:
        having an input and an output for generating and sending an authorization for a compound document including document metadata and page metadata associated with the image of the physical seal to a computing device, the document metadata being associated with the compound document and the page metadata being associated with each page of the compound document, the document metadata and the page metadata being stored in nested directories,
        receiving from the image sensor the image of the physical seal and transmitting the image of the physical seal to the computing device,
        receiving from the computing device a new hash that is computed based at least in part on the image of the physical seal,
        generating a rolling hash using a hash function of previous hashes and the new hash,
        transmitting the rolling hash to the computing device, and
        receiving the document metadata and the page metadata that were updated to include the rolling hash and the new hash, wherein the computing device updates the page metadata associated with a page of the compound document to include the rolling hash and the new hash and wherein the document metadata is updated based on the update of the page metadata.

2. The capture device of claim 1 wherein the detector is a force sensor or an infrared (IR) transceiver.

3. The capture device of claim 1 further comprising an illumination device for lighting an area upon which the physical seal is stamped, the illumination device coupled to and controlled by the controller.

4. The capture device of claim 1 further comprising a logging module for creating and maintaining a log of authorizations generated by the controller, the logging module coupled to the controller.

5. The capture device of claim 1 wherein the controller receives images from another computing device, and the capture device comprises a display device to display the received images, the display device coupled to the controller.

6. The capture device of claim 1 wherein the controller performs a background cleanup procedure so as to retain only salient features of the physical seal's footprint.

7. The capture device of claim 1 wherein the document metadata comprises a date, a time, a serial number of the capture device and the rolling hash.

8. A method comprising:
sensing pressure from application of a physical seal to a capture device;
generating a signal for activating illumination and capturing an image of the physical seal in response to the physical seal being pressed upon the capture device;
capturing the image of the physical seal in response to the signal;
generating and sending an authorization for a compound document including document metadata and page metadata associated with the image of the physical seal to a computing device, the document metadata being associated with the compound document and the page metadata being associated with each page of the compound document, the document metadata and the page metadata being stored in nested directories;
transmitting the image of the physical seal to the computing device;
receiving, from the computing device, a new hash that is computed based at least in part on the image of the physical seal;
generating a rolling hash, with the capture device, using a hash function of previous hashes and the new hash;
transmitting the rolling hash to the computing device;
receiving the document metadata and the page metadata that were updated to include the rolling hash and the new hash;
wherein the computing device updates the page metadata associated with a page of the compound document to include the rolling hash and the new hash; and
wherein the document metadata is updated based on the update of the page metadata.

9. The method of claim 8 further comprising displaying all or part of the compound document on the capture device.

10. The method of claim 8 wherein the document metadata comprises a date, a time and a serial number of the capture device.

11. The method of claim 8 wherein the document metadata comprises a pointer to a log of a server.

12. The method of claim 8 further comprising storing an entry in a local log that includes the authorization.

13. The method of claim 8 further comprising storing the page metadata at the capture device.

14. The method of claim 8 further comprising sending the authorization to and storing the authorization at a server.

15. The method of claim 8 wherein capturing the image of the physical seal further comprises performing a background cleanup procedure so as to retain only salient features of the physical seal's footprint.

16. The method of claim 8 further comprising sending the compound document including the authorization to a next step in an electronic workflow.

17. The method of claim 8 further comprising verifying consistency between the document metadata recorded in the compound document and a server.

18. A computer program product comprising a non-transitory computer usable medium including a computer readable program, wherein the computer readable program when executed on a computer causes the computer to:
sensing pressure from application of a physical seal to a capture device;
generating a signal for activating illumination and capturing an image of the physical seal in response to the physical seal being pressed upon the capture device;
capturing the image of the physical seal in response to the signal;
generating and sending an authorization for a compound document including document metadata and page metadata associated with the image of the physical seal to a computing device, the document metadata being associated with the compound document and the page metadata being associated with each page of the compound document, the document metadata and the page metadata being stored in nested directories;
transmitting the image of the physical seal to the computing device;
receiving, from the computing device, a new hash that is computed based at least in part on the image of the physical seal;
generating a rolling hash, with the capture device, using a hash function of previous hashes and the new hash;
transmitting the rolling hash to the computing device;
receiving the document metadata and page metadata that were updated to include the rolling hash and the new hash;
wherein the computing device updates the page metadata associated with a page of the compound document to include the rolling hash and the new hash; and
wherein the document metadata is updated based on the update of the page metadata.

19. The computer program product of claim 18 wherein the computer readable program when executed on the computer further causes the computer to light an area upon which the physical seal is stamped.

20. The computer program product of claim 18 wherein the computer readable program when executed on the computer further causes the computer to create and maintain a log of authorizations.

* * * * *